US012587854B2

(12) United States Patent
Lee et al.

(10) Patent No.: US 12,587,854 B2
(45) Date of Patent: Mar. 24, 2026

(54) DOWNLINK MESSAGE PROTECTION FOR AMBIENT WIRELESS DEVICES

(71) Applicant: QUALCOMM Incorporated, San Diego, CA (US)

(72) Inventors: Soo Bum Lee, San Diego, CA (US); Sebastian Speicher, Wallisellen (CH)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 18/423,096

(22) Filed: Jan. 25, 2024

(65) Prior Publication Data

US 2025/0247702 A1     Jul. 31, 2025

(51) Int. Cl.
*H04W 12/084*     (2021.01)
*H04W 12/041*     (2021.01)

(52) U.S. Cl.
CPC ....... *H04W 12/084* (2021.01); *H04W 12/041* (2021.01)

(58) Field of Classification Search
CPC .......................... H04W 12/084; H04W 12/041
See application file for complete search history.

(56) References Cited

U.S. PATENT DOCUMENTS

| | | | | | |
|---|---|---|---|---|---|
| 8,526,618 B2 * | 9/2013 | Little | .................. | H04W 12/033 380/270 |
| 8,554,205 B2 * | 10/2013 | Shi | ........................ | H04W 8/183 455/432.1 |
| 10,884,883 B2 * | 1/2021 | Rubin | ............... | H04W 36/0033 |
| 11,265,712 B2 * | 3/2022 | Lee | ...................... | H04W 12/088 |
| 2008/0204248 A1 * | 8/2008 | Cam Winget | ......... | H04W 8/245 340/572.4 |
| 2010/0105378 A1 * | 4/2010 | Shi | ........................ | H04W 48/18 455/432.1 |
| 2012/0216032 A1 * | 8/2012 | Little | ................... | G06Q 10/107 713/150 |
| 2018/0288016 A1 * | 10/2018 | Stein | ..................... | H04W 12/06 |
| 2019/0124515 A1 * | 4/2019 | Zhang | ................... | H04W 76/15 |
| 2019/0253243 A1 * | 8/2019 | Zimmerman | ........... | H04W 4/80 |

(Continued)

FOREIGN PATENT DOCUMENTS

EP          4297443 A1     12/2023

OTHER PUBLICATIONS

International Search Report and Written Opinion—PCT/US2025/011254—ISA/EPO—Mar. 20, 2025.

*Primary Examiner* — J. Brant Murphy
(74) *Attorney, Agent, or Firm* — Holland & Hart LLP

(57)     ABSTRACT

Methods, systems, and devices for wireless communications, including downlink message protection for ambient wireless devices, are described. An ambient wireless device (e.g., tag) receives a downlink message including a first configuration for the ambient wireless device associated with one or more services. The ambient wireless device enables the one or more services at the ambient wireless device based on the first configuration. The ambient wireless device receives an encoded downlink message including a first key. The ambient wireless device decodes the encoded downlink message based on a second key, the encoded downlink message including a second configuration. The ambient wireless device modifies the one or more services or activates a response transmission associated with the ambient wireless device based on the second configuration.

27 Claims, 16 Drawing Sheets

(56)  References Cited

U.S. PATENT DOCUMENTS

| | | | | |
|---|---|---|---|---|
| 2019/0253469 | A1* | 8/2019 | Rubin | H04L 1/0027 |
| 2019/0349306 | A1* | 11/2019 | Lee | H04L 47/20 |
| 2020/0313984 | A1* | 10/2020 | Lee | H04L 65/765 |
| 2020/0359280 | A1* | 11/2020 | Li | H04W 12/10 |
| 2021/0153282 | A1* | 5/2021 | Jo | H04W 76/18 |
| 2023/0396433 | A1* | 12/2023 | Guo | H04W 12/041 |
| 2024/0073212 | A1* | 2/2024 | Wu | H04L 67/56 |

* cited by examiner

910

920

915

905

900

130

105

115

Network
Entity

Transceiver

1210

Antenna

1215

Communications
Manager

1220

Memory

Code

1230

1225

1240

Processor

1235

1205

1200

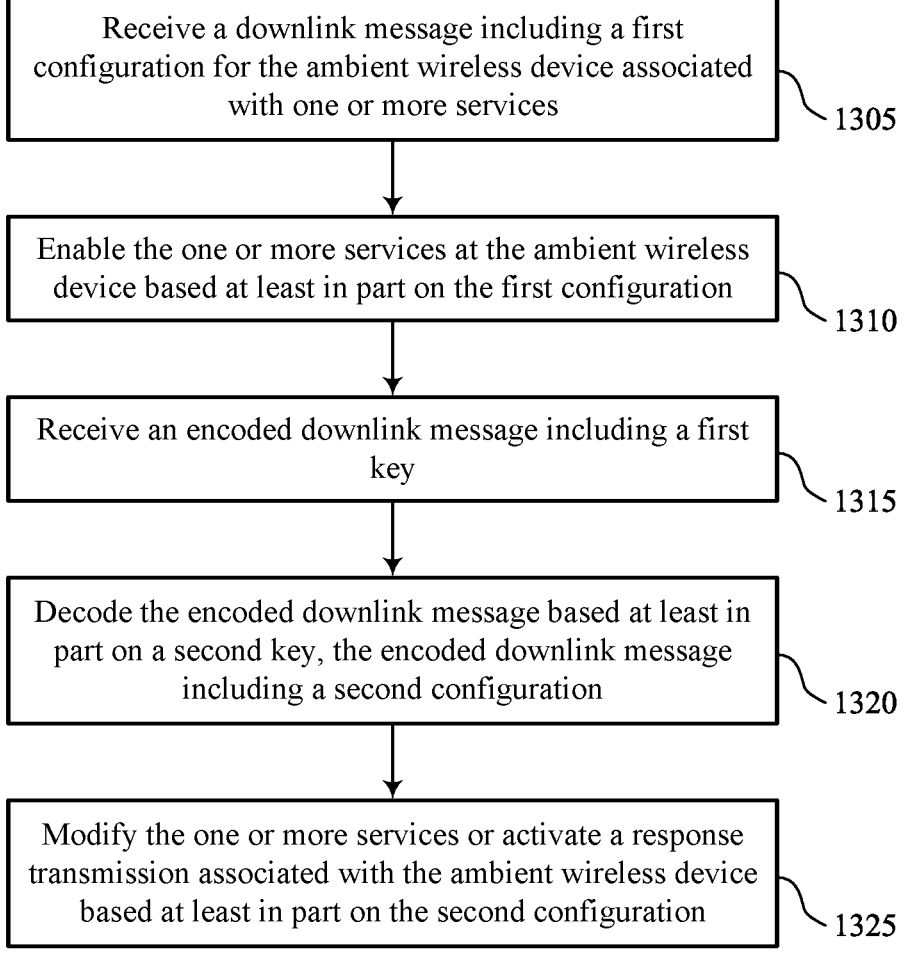

Receive a downlink message including a first configuration for the ambient wireless device associated with one or more services

1305

Enable the one or more services at the ambient wireless device based at least in part on the first configuration

1310

Receive an encoded downlink message including a first key

1315

Decode the encoded downlink message based at least in part on a second key, the encoded downlink message including a second configuration

1320

Modify the one or more services or activate a response transmission associated with the ambient wireless device based at least in part on the second configuration

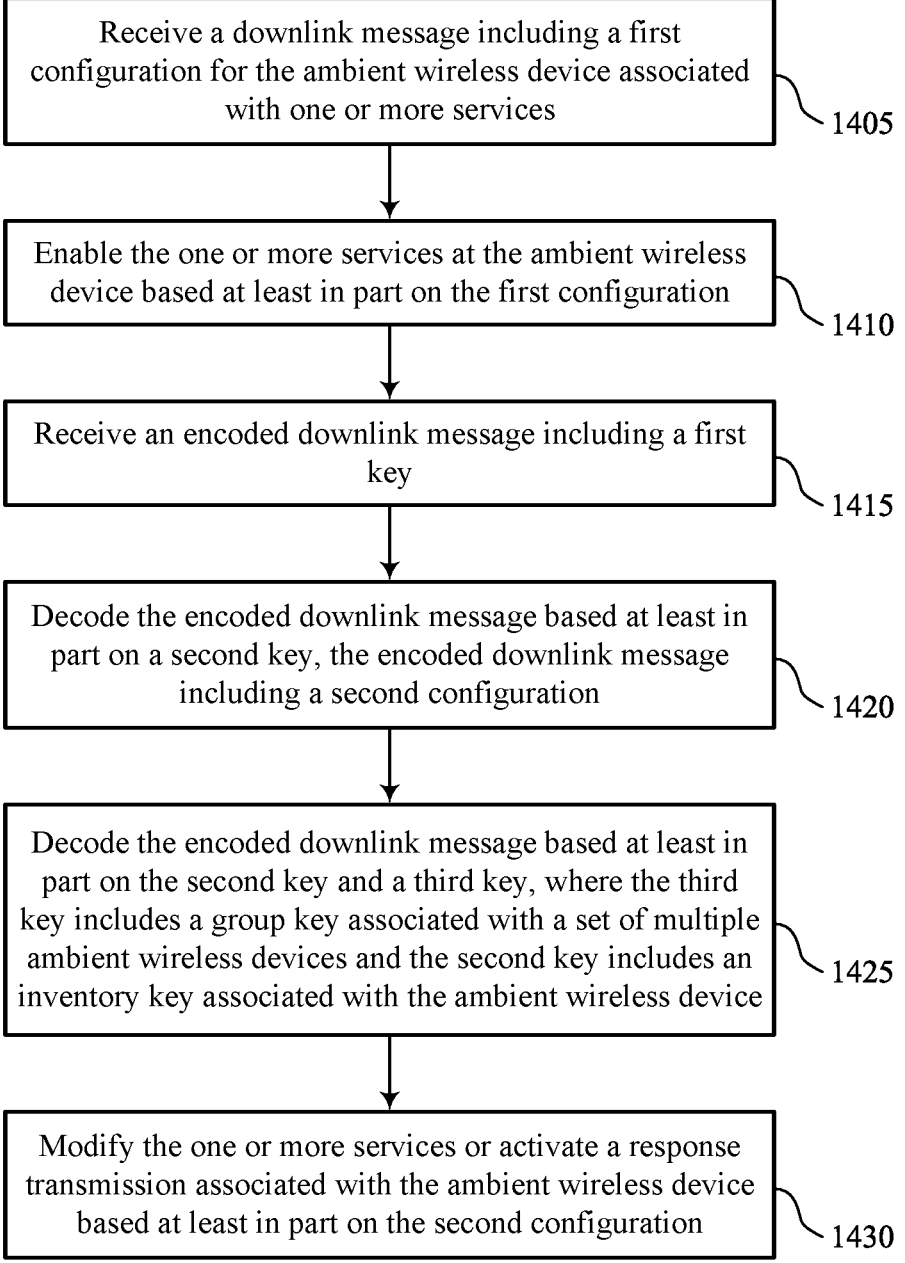

Receive a downlink message including a first configuration for the ambient wireless device associated with one or more services ⟍ 1405

Enable the one or more services at the ambient wireless device based at least in part on the first configuration ⟍ 1410

Receive an encoded downlink message including a first key ⟍ 1415

Decode the encoded downlink message based at least in part on a second key, the encoded downlink message including a second configuration ⟍ 1420

Decode the encoded downlink message based at least in part on the second key and a third key, where the third key includes a group key associated with a set of multiple ambient wireless devices and the second key includes an inventory key associated with the ambient wireless device ⟍ 1425

Modify the one or more services or activate a response transmission associated with the ambient wireless device based at least in part on the second configuration ⟍ 1430

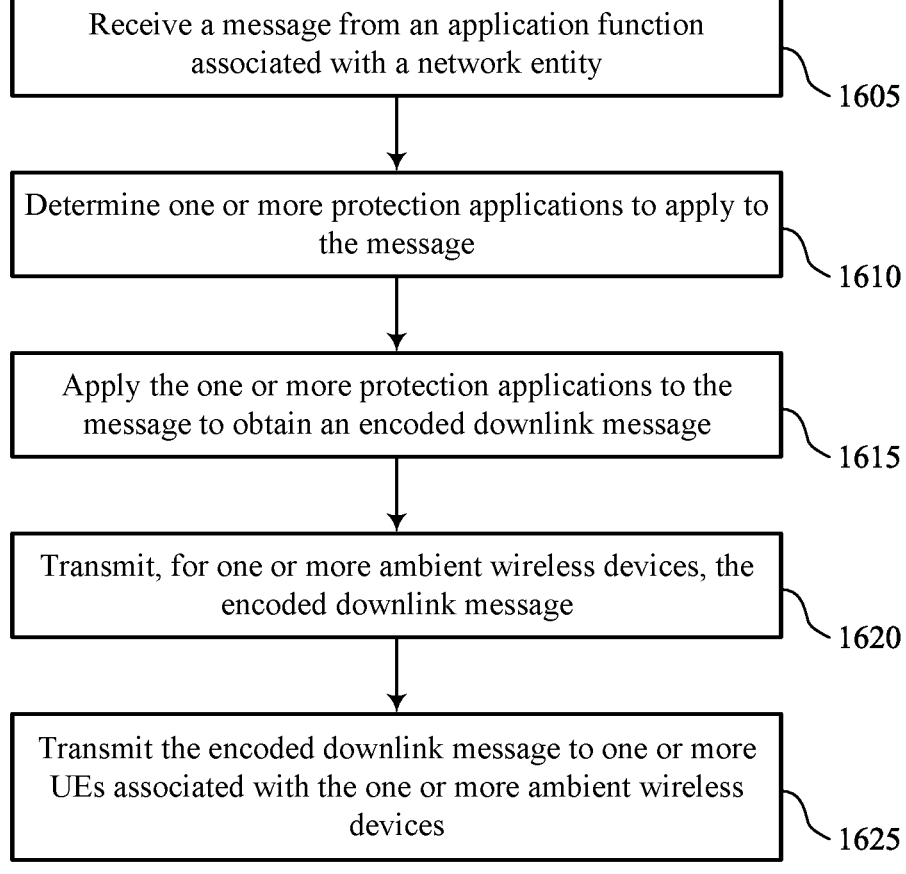

Receive a message from an application function associated with a network entity ⟍ 1605

Determine one or more protection applications to apply to the message ⟍ 1610

Apply the one or more protection applications to the message to obtain an encoded downlink message ⟍ 1615

Transmit, for one or more ambient wireless devices, the encoded downlink message ⟍ 1620

Transmit the encoded downlink message to one or more UEs associated with the one or more ambient wireless devices ⟍ 1625

DOWNLINK MESSAGE PROTECTION FOR AMBIENT WIRELESS DEVICES

TECHNICAL FIELD

The following relates to wireless communications, including downlink message protection for ambient wireless devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may include ambient wireless devices (e.g., ambient internet of things (IoT) devices or tags) that provide one or more services, such as services involving tracking or indicating a location. The wireless communications system may also include an application function, an ambient IoT controller (or tag controller), and/or a user equipment (UE) that may facilitate configuring or communicating with the ambient wireless devices (e.g., requesting service data) using one or more messages, such as one or more downlink messages.

SUMMARY

The described techniques relate to improved methods, systems, devices, and apparatuses that support downlink message protection for ambient wireless devices. An ambient wireless device (e.g., an ambient internet of things (IoT) device or a tag) may verify a downlink message received, for example, from a tag controller, which may generate and/or protect the downlink message, without establishing a secure connection with the tag controller. The downlink message may include a command message or an inventory message, where the command message may be used to update a configuration at the ambient wireless device and the inventory message may be used to trigger a response from the ambient wireless device.

In some examples, the application function may provide an end-to-end protection of a downlink message, such as a downlink command message, that is passed through the tag controller using a shared key that is shared with the ambient wireless device. In some examples, the tag controller may provide protection of a downlink command message using a command protection key provided by the application function, where the downlink message includes a command verification token that is used by the ambient wireless device to verify authorization of the tag controller for the downlink command message. In some examples, the tag controller may provide protection of a downlink command message using a command protection key provided by the application function and may sign the downlink command message using a signing key (e.g., a privacy key associated with a verification key or a public key certificate). The verification key associated with the signing key may be used by the ambient wireless device to verify the command protection key of the downlink command message. In some examples, the tag controller may provide protection of a downlink command message using a command protection key that is generated by the tag controller. In some examples, the tag controller may provide, for example in a multicast transmission, a downlink inventory message to multiple ambient wireless devices. The tag controller may receive an inventory key from an application function or the tag controller may derive an inventory key from a group key received from the application function. The tag controller may protect the downlink inventory message using the inventory key, which may be used by the ambient wireless device to verify the downlink inventory message and authorization of the tag controller. The protection techniques described herein may facilitate efficiently securing downlink messages transmitted from the network (e.g., via an application function of the network) to the ambient wireless device without having to form a secure connection between the network and the ambient wireless device, for example, where the secure connection is associated with complex processes and/or a large quantity of storage space for storing verification-related data.

A method for wireless communications by an ambient wireless device is described. The method may include receiving a downlink message including a first configuration for the ambient wireless device associated with one or more services, enabling the one or more services at the ambient wireless device based on the first configuration, receiving an encoded downlink message including a first key, decoding the encoded downlink message based on a second key, the encoded downlink message including a second configuration, and modifying the one or more services or activate a response transmission associated with the ambient wireless device based on the second configuration.

An ambient wireless device for wireless communications is described. The ambient wireless device may include one or more memories storing processor executable code, and one or more processors coupled with the one or more memories. The one or more processors may individually or collectively be operable to execute the code (e.g., directly, indirectly, after pre-processing, without pre-processing) to cause the ambient wireless device to receive a downlink message including a first configuration for the ambient wireless device associated with one or more services, enable the one or more services at the ambient wireless device based on the first configuration, receive an encoded downlink message including a first key, decode the encoded downlink message based on a second key, the encoded downlink message including a second configuration, and modify the one or more services or activate a response transmission associated with the ambient wireless device based on the second configuration.

Another ambient wireless device for wireless communications is described. The ambient wireless device may include means for receiving a downlink message including a first configuration for the ambient wireless device associated with one or more services, means for enabling the one or more services at the ambient wireless device based on the first configuration, means for receiving an encoded downlink message including a first key, means for decoding the encoded downlink message based on a second key, the encoded downlink message including a second configuration, and means for modifying the one or more services or activating a response transmission associated with the ambient wireless device based on the second configuration.

A non-transitory computer-readable medium storing code for wireless communications is described. The code may include instructions executable by one or more processors (e.g., directly, indirectly, after pre-processing, without pre-processing) to receive a downlink message including a first configuration for the ambient wireless device associated with one or more services, enable the one or more services at the ambient wireless device based on the first configuration, receive an encoded downlink message including a first key, decode the encoded downlink message based on a second key, the encoded downlink message including a second configuration, and modify the one or more services or activate a response transmission associated with the ambient wireless device based on the second configuration.

Some examples of the method, ambient wireless devices, and non-transitory computer-readable medium described herein may further include operations, features, means, or instructions for receiving the encoded downlink message may be based on a change to the one or more configurations for services, a requested response transmission from the ambient wireless device, or both.

In some examples of the method, ambient wireless devices, and non-transitory computer-readable medium described herein, the first key and the second key may be a single shared key between the ambient wireless device and an application function associated with a network entity.

In some examples of the method, ambient wireless devices, and non-transitory computer-readable medium described herein, the second key may be based on a shared key between the ambient wireless device and an application function associated with a network entity.

In some examples of the method, ambient wireless devices, and non-transitory computer-readable medium described herein, the second key may be associated with one or more key refresh parameters.

In some examples of the method, ambient wireless devices, and non-transitory computer-readable medium described herein, the encoded downlink message further includes a token.

In some examples of the method, ambient wireless devices, and non-transitory computer-readable medium described herein, receiving the encoded downlink message may include operations, features, means, or instructions for receiving the encoded downlink message from an ambient wireless controller associated with a network entity, via one or more UEs and verifying authorization of the ambient wireless controller to transmit the encoded downlink message to the ambient wireless device based on the token.

Some examples of the method, ambient wireless devices, and non-transitory computer-readable medium described herein may further include operations, features, means, or instructions for decoding the encoded downlink message may be based on verifying authorization of the ambient wireless controller using the token.

In some examples of the method, ambient wireless devices, and non-transitory computer-readable medium described herein, the second key may be generated by an ambient wireless controller associated with a network entity.

In some examples of the method, ambient wireless devices, and non-transitory computer-readable medium described herein, the second key may be generated by an application function associated with a network entity.

In some examples of the method, ambient wireless devices, and non-transitory computer-readable medium described herein, receiving the encoded downlink message may include operations, features, means, or instructions for receiving the encoded downlink message from an ambient wireless controller associated with a network entity, where the encoded downlink message includes a signature and verifying authorization of the ambient wireless controller to transmit the encoded downlink message to the ambient wireless device based on the signature.

In some examples of the method, ambient wireless devices, and non-transitory computer-readable medium described herein, the one or more services may be associated with location or tracking.

In some examples of the method, ambient wireless devices, and non-transitory computer-readable medium described herein, decoding the encoded downlink message may include operations, features, means, or instructions for decoding the encoded downlink message based on the second key and a third key, where the third key includes a group key associated with a set of multiple ambient wireless devices and the second key includes an inventory key associated with the ambient wireless device.

In some examples of the method, ambient wireless devices, and non-transitory computer-readable medium described herein, the inventory key may be based on the group key.

A method for wireless communications by an ambient wireless controller is described. The method may include receiving a message from an application function associated with a network entity, determining one or more protection applications to apply to the message, applying the one or more protection applications to the message to obtain an encoded downlink message, and transmitting, for one or more ambient wireless devices, the encoded downlink message.

An ambient wireless controller for wireless communications is described. The ambient wireless controller may include one or more memories storing processor executable code, and one or more processors coupled with the one or more memories. The one or more processors may individually or collectively be operable to execute the code (e.g., directly, indirectly, after pre-processing, without pre-processing) to cause the ambient wireless controller to receive a message from an application function associated with a network entity, determine one or more protection applications to apply to the message, apply the one or more protection applications to the message to obtain an encoded downlink message, and transmit, for one or more ambient wireless devices, the encoded downlink message.

Another ambient wireless controller for wireless communications is described. The ambient wireless controller may include means for receiving a message from an application function associated with a network entity, means for determining one or more protection applications to apply to the message, means for applying the one or more protection applications to the message to obtain an encoded downlink message, and means for transmitting, for one or more ambient wireless devices, the encoded downlink message.

A non-transitory computer-readable medium storing code for wireless communications is described. The code may include instructions executable by one or more processors (e.g., directly, indirectly, after pre-processing, without pre-processing) to receive a message from an application function associated with a network entity, determine one or more protection applications to apply to the message, apply the one or more protection applications to the message to obtain an encoded downlink message, and transmit, for one or more ambient wireless devices, the encoded downlink message.

In some examples of the method, ambient wireless controllers, and non-transitory computer-readable medium described herein, the message includes the encoded downlink message, a downlink information for the encoded downlink message, a first key, a token, or any combination thereof.

In some examples of the method, ambient wireless controllers, and non-transitory computer-readable medium described herein, the one or more protection applications include one or more command protection applications, one or more inventory protection applications, or a combination thereof.

Some examples of the method, ambient wireless controllers, and non-transitory computer-readable medium described herein may further include operations, features, means, or instructions for transmitting the encoded downlink message may be based on a change to one or more configurations for services provided by the one or more ambient wireless devices, a requested response transmission from the one or more ambient wireless devices, or both.

In some examples of the method, ambient wireless controllers, and non-transitory computer-readable medium described herein, a first key of the message may be based on a shared key between the one or more ambient wireless devices and the application function.

In some examples of the method, ambient wireless controllers, and non-transitory computer-readable medium described herein, a first key of the message may be associated with one or more key refresh parameters.

In some examples of the method, ambient wireless controllers, and non-transitory computer-readable medium described herein, the encoded downlink message includes a token of the message.

In some examples of the method, ambient wireless controllers, and non-transitory computer-readable medium described herein, transmitting the encoded downlink message may include operations, features, means, or instructions for transmitting the encoded downlink message to one or more user equipments (UEs) associated with the one or more ambient wireless devices.

In some examples of the method, ambient wireless controllers, and non-transitory computer-readable medium described herein, the one or more UEs include a network reader, a device reader, or both.

In some examples of the method, ambient wireless controllers, and non-transitory computer-readable medium described herein, applying the one or more protection applications may include operations, features, means, or instructions for encoding downlink information of the message using a first key of the message from the application function and transmitting the encoded downlink message for the one or more ambient wireless devices.

In some examples of the method, ambient wireless controllers, and non-transitory computer-readable medium described herein, applying the one or more protection applications may include operations, features, means, or instructions for receive an authorization token and a first key from the application function, encoding downlink information of the message using the first key of the message, sign the encoded downlink information using a signing key of the message, where the signed encoded downlink information includes the authorization token, and transmitting the encoded downlink message for the one or more ambient wireless devices.

In some examples of the method, ambient wireless controllers, and non-transitory computer-readable medium described herein, applying the one or more protection applications may include operations, features, means, or instructions for generating a first key, encoding downlink information of the message using the first key, and transmitting the encoded downlink message for the one or more ambient wireless devices.

In some examples of the method, ambient wireless controllers, and non-transitory computer-readable medium described herein, applying the one or more protection applications may include operations, features, means, or instructions for receiving a group key from the application function, the group key associated with at least the one or more ambient wireless devices, encoding downlink information of the message using an inventory key based on the group key, and transmitting the encoded downlink message for the one or more ambient wireless devices.

BRIEF DESCRIPTION OF THE DRAWINGS

FIGS. 13 through 16 show flowcharts illustrating methods that support downlink message protection for ambient wireless devices in accordance with one or more aspects of the present disclosure.

DETAILED DESCRIPTION

Figure 1:
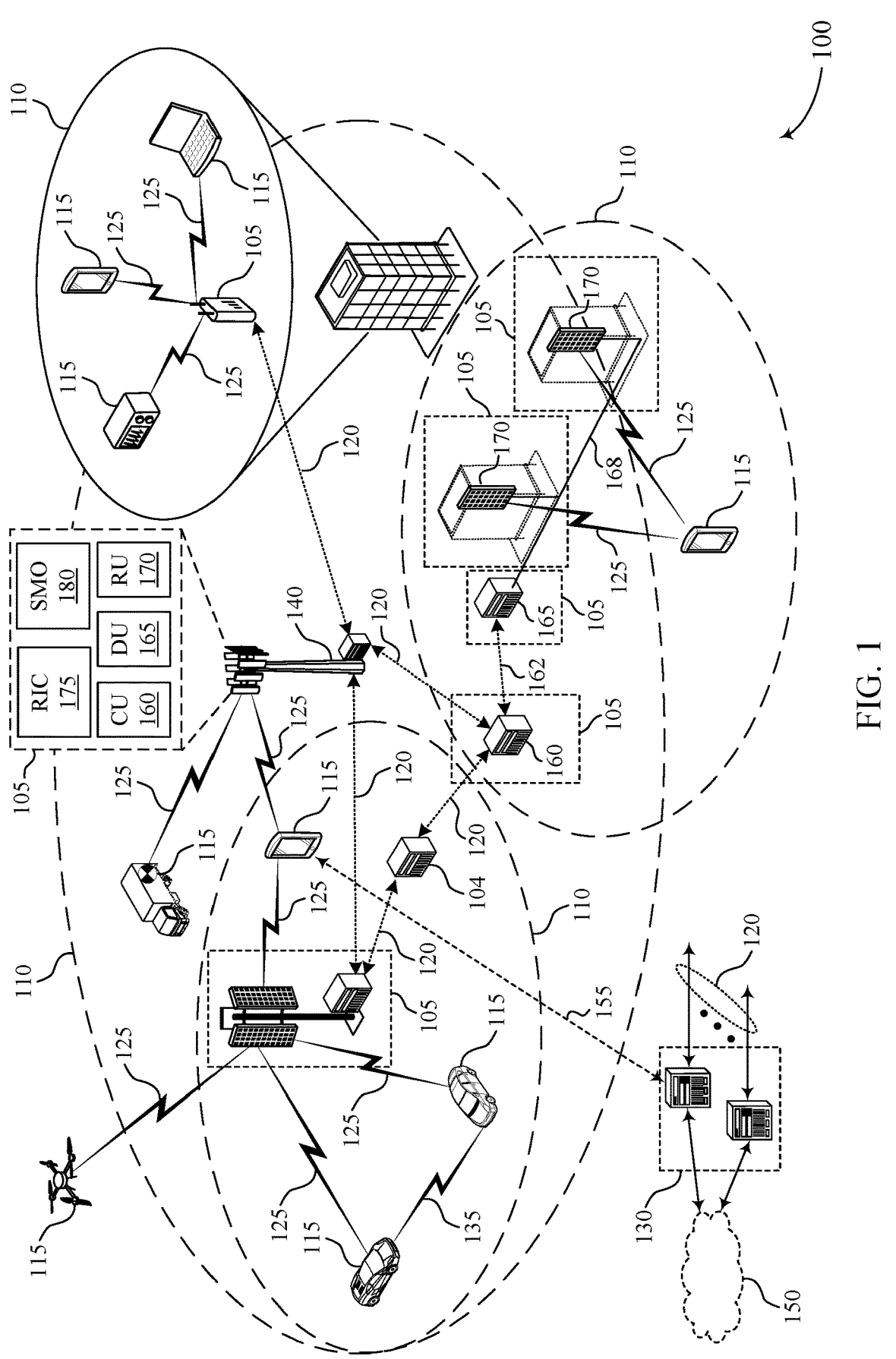
FIG. 1 shows an example of a wireless communications system that supports downlink message protection for ambient wireless devices in accordance with one or more aspects of the present disclosure.

Some wireless communications systems may include ambient wireless devices (e.g., ambient internet of things (IoT) devices or tags) that provide one or more services, such as services involving tracking or indicating a location. The wireless communications system may also include an application function, an ambient IoT controller (or a tag controller), and/or a user equipment (UE) that may facilitate configuring or communicating with the ambient wireless devices (e.g., requesting service data) using one or more messages, such as one or more downlink messages. For example, the application function may send a downlink message to the tag controller, which may send the downlink message to the UE, which may send the downlink message to the ambient wireless devices. To provide secure communications between the devices of the wireless communications system, keys, tag identifications (ID), tokens, or other verification-related data may be used and/or stored at the devices. In some cases, the verification-related data may vary between the devices. For example, the ambient wireless devices may use different verification-related data to verify authorization for communications with the application function and the tag controller. However, the ambient wireless devices may have shortcomings, such as not having enough memory to store the various verification-related data. Moreover, in some cases, the tag controller may not have a shared credential with the ambient wireless device for the ambient wireless device to verify authorization of the downlink message from the tag controller.

An ambient wireless device (e.g., an IoT device or a tag) may verify a downlink message from a tag controller, which may generate and/or protect the downlink message, without establishing a secure connection with a tag controller. The downlink message may include a command message or an inventory message (among other examples), where the command message may be used to update configuration at the ambient wireless device and the inventory message may be used to trigger a response from the ambient wireless device.

In some examples, the application function may provide an end-to-end protection of a downlink command message that is passed through the tag controller using a shared key that is shared with the ambient wireless device. In some examples, the tag controller may provide protection of a downlink command message using a command protection key provided by the application function, where the downlink message includes a command verification token that is used by the ambient wireless device to verify authorization of the tag controller for the downlink command message. In some examples, the tag controller may provide protection of a downlink command message using a command protection key provided by the application function and may also sign the downlink command message using a signing key (e.g., a private key associated with a verification key or a public key certificate). The verification key associated with the signing key may be used by the ambient wireless device to verify the command protection key of the downlink command message. In some examples, the tag controller may provide protection of a downlink command message using a command protection key that is generated by the tag controller. In some examples, the tag controller may provide, for example in a multicast transmission, a downlink inventory message to multiple ambient wireless devices. The tag controller may receive an inventory key from an application function or the tag controller may derive an inventory key from a group key received from the application function. The tag controller may protect the downlink inventory message using the inventory key, which may be used by the ambient wireless device to verify the downlink inventory message. The protection techniques described herein may, among other advantages, facilitate efficiently securing downlink messages transmitted from the network (e.g., via an application function of the network) to the ambient wireless device without having to form a secure connection between the network and the ambient wireless device, for example, where the secure connection is associated with complex processes and/or a large quantity of storage space for storing verification-related data.

Aspects of the disclosure are initially described in the context of wireless communications systems. Aspects of the disclosure are further illustrated by and described with reference to apparatus diagrams, system diagrams, and flowcharts that relate to downlink message protection for ambient wireless devices. As discussed herein, an "ambient wireless device" refers to a device that derives energy from an ambient environment. The ambient wireless device may backscatter and/or store energy received in the ambient environment, such as from radio frequency waves, and convert the energy to usable power to transmit signals. The "ambient wireless device" may include a tag or an ambient IoT device in an IoT system. Accordingly, "ambient wireless device" may refer to and/or be used interchangeably with "tag" and/or "ambient IoT."

FIG. 1 shows an example of a wireless communications system 100 that supports downlink message protection for ambient wireless devices in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, or computing system, (among other examples) may include disclosure of the UE 115, network entity 105, apparatus, device, or computing system, (among other examples) being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support downlink message protection for ambient wireless devices as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and Ne may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 may include ambient wireless devices (e.g., tags) that provide one or more services, such as services involving tracking or indicating a location. The wireless communications system 100 may also include an application function, a tag controller, and/or the UE 115 that may facilitate configuring or communicating with the ambient wireless devices (e.g., requesting service data) using downlink messages.

To provide secure communications between the devices of the wireless communications system 100, various different keys, tag identifications (ID), tokens, or other verification-related data may be stored at the devices. However, the ambient wireless devices may not have enough memory to store the various verification-related data. Moreover, in some cases, the tag controller may not have a shared credential with the ambient wireless device for the ambient wireless device to verify authorization of the downlink message from the tag controller, which may have received the downlink message from the application function.

As discussed herein, an ambient wireless device may verify a downlink message from a tag controller, which may generate and/or protect the downlink message, without establishing a secure connection with a tag controller. The downlink message may include a command message or an inventory message (among other examples), where the command message may be used to update configuration at the ambient wireless device and the inventory message may be used to trigger a response from the ambient wireless device. In some examples, the application function may provide an end-to-end protection of a downlink command message that is passed through the tag controller using a shared key that is shared with the ambient wireless device. In some examples, the tag controller may provide protection of a downlink command message using a command protection key provided by the application function, where the downlink message may include a command verification token that is used by the ambient wireless device to verify authorization of the tag controller for the downlink command message. In some examples, the tag controller may provide protection of a downlink command message using a command protection key provided by the application function and may also sign the downlink command message using a signing key (e.g., private key associated with a certificate). The singing key may be used by the ambient wireless device to verify the command protection key of the downlink command message. In some examples, the tag controller may provide protection of a downlink command message using a command protection key that is for example generated by the tag controller. In some examples, the tag controller may provide, for example in a multicast transmission, a downlink inventory message to multiple ambient wireless devices. The tag controller may receive a group key and the tag controller may derive an inventory key. The tag controller may protect the downlink inventory message using the inventory key, which is used by the ambient wireless device to verify authorization of the tag controller.

The protection techniques described herein may, among other advantages, facilitate efficiently securing downlink messages transmitted from the network (e.g., network entity 105 via an application function of the network) to the ambient wireless device without having to form a secure connection between the network and the ambient wireless device. The secure connection may be associated with complex processes and/or a large quantity of storage space for storing verification-related data.

Figure 2:
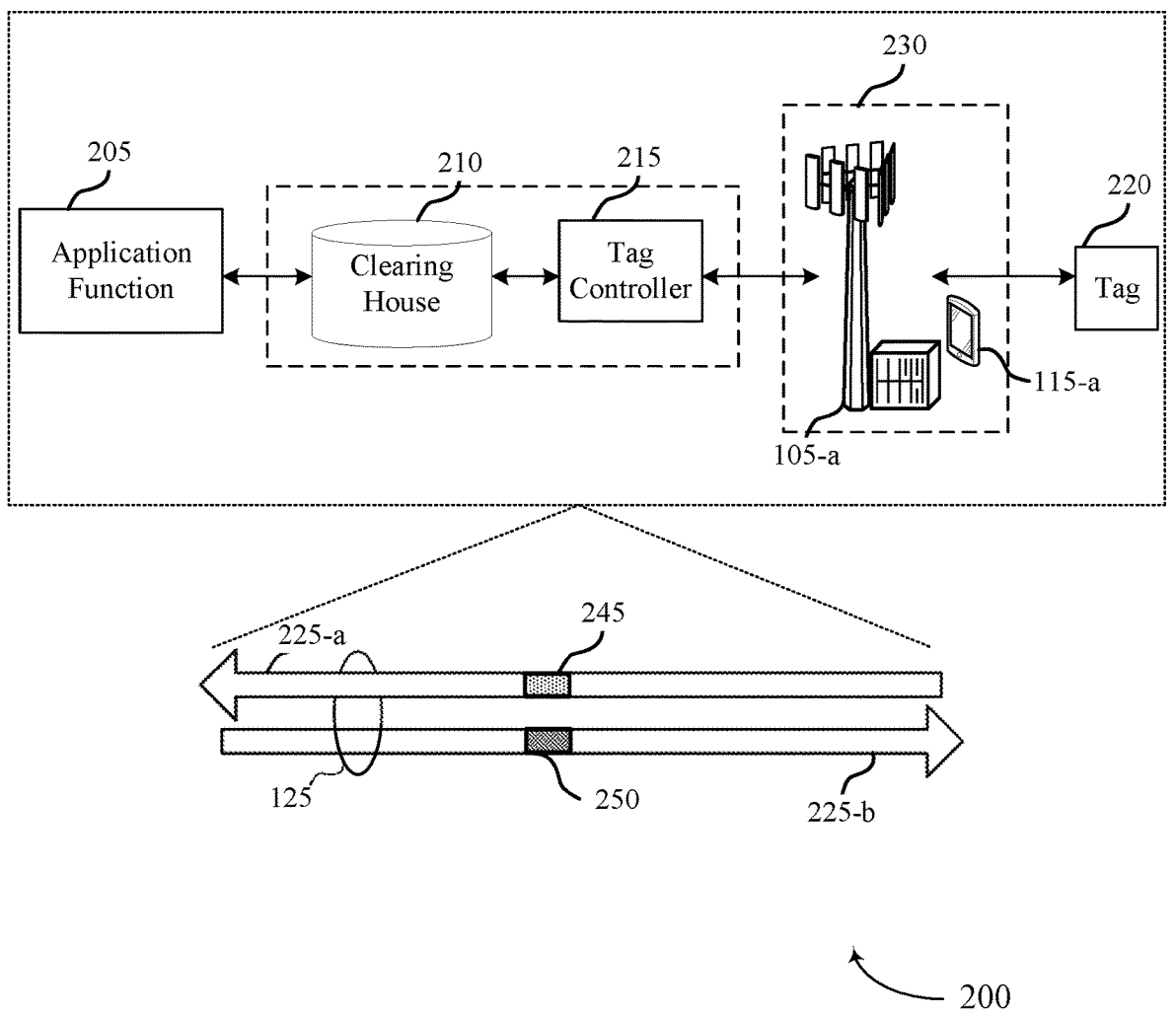
FIG. 2 shows an example of a wireless communication system that supports downlink message protection for ambient wireless devices in accordance with one or more aspects of the present disclosure.

FIG. 2 shows an example of a wireless communications system 200 that supports downlink message protection for ambient wireless devices in accordance with one or more aspects of the present disclosure. The wireless communications system 200 may implement aspects of or may be implemented by aspects of the wireless communications system 100. For example, the wireless communications system 200 includes a UE 115-a and a network entity 105-a, which may be examples of a UE 115 and a network entity 105 described with respect to FIG. 1.

The wireless communications system 200 may include, among other things, an application function 205, a clearing house 210, a tag controller 215, a tag reader 230 including a network entity 105-a and a UE 115-a, and a tag 220 (e.g., collectively referred to as "ambient service components"). In some examples, ambient wireless devices (e.g., a tag 220) may include a device type A, a device type B, and/or a device type C. The device type A may not have storage to store energy nor independent signal generation (e.g., back scattering transmissions). Device type A may be associated with short range communications and low data rates, energy harvesting may be directly received from radio frequency (RF) devices, and network initiated communications only (NICO). The device type B may have storage to store energy but may not independently generate signals (e.g., back scattering transmissions). Device type B may use stored energy to amplify reflected signals. Device type B may be associated with relatively longer range communications (e.g., with respect to communications range of device type A) that is provided by energy harvesting in a NICO mode. In some examples, device type A and/or device type B devices may not support 3GPP defined protocols due to respective overhead. In such examples, the device types A and B may operate as a UE 115 (e.g., a "special UE" or not a new UE 115) or as a new UE 115. As a UE 115, existing CN functions may be adapted to the device type to support a new UE 115. NICO and mobility managements aspect may be partially hidden from other network functions by regularly polling (e.g., polling at time intervals) by RAN or an access and mobility function (AMF). Device reachability or availability may not be guaranteed. As a new UE 115, device type A and B may be completely or partially invisible to the CN. In some examples, new CN functions may be applied to a new UE 115, for example, for mobility management. In some examples, the ambient wireless device may include a device type C, which may have storage for energy storage and may independently generate signals (e.g., active RF component for transmission). The device type C may be able to send uplink transmissions, which may be signaling indicating requests (e.g., with communications similarly to device type A and device type B). If uplink transmission supports requests, device type C may operate similarly to device type A and device type B.

The device type C may support uplink transmissions indicating requests to the CN in a manner similarly to device type A and device type B. The device type C may support uplink transmissions indicating data in a similar manner to transmissions in a low power (LP) IoT (LP-IoT). As a UE 115, the device type C may operate similarly to device types A and B, such that the device type C may be associated with reduced network-based tracking and polling. As a new UE 115, the device type C may operate similar to devices in a LP-IoT in 5GCN. That is, device type A may not have energy storage and may not generate signals, device type B may have storage to boost or amplify signals, and device type C may operate similarly to IoT device, have storage for energy (e.g., but less than MTC devices), and have a short communications range (e.g., to use for signaling indicating a request or data).

In some examples, the ambient wireless device (e.g., ambient IoT), which may be the tag 220, may be associated with device type A and/or device type B. For upper layer capability associated with the ambient wireless device, the ambient wireless device maintain a minimal state, such that a session context management and/or storage are not supported, and stateless operations may be preferred. The ambient wireless device may not support 3GPP protocol stacks, for example, since the cost may be above a threshold (e.g., too costly to implement complex protocol stacks for user place (U-plane) or a control plane (C-plane)). In some examples, the ambient wireless device may not have subscriber identity module (SIM) credentials, for example, since the cost associated with the SIM and a mobile network operator (MNO) supporting the SIM, may be above a threshold (e.g., too expensive). In some examples, the ambient wireless device may have a small quantity of cryptographic and/or processing capabilities (e.g., below a process threshold). The ambient wireless device may be associated with simple circuitry that is available for processing for the ambient wireless device.

A workflow to provide and support ambient wireless services may involve various communications between the network and various devices, such as the application function 205, the clearing house 210, the tag controller 215, the tag reader 230 that includes the network entity 105-a and the UE 115-a, and the tag 220 (e.g., ambient wireless device). The application function 205 of the network (e.g., tag application) may receive tag information and/or service data (e.g., from the tag controller 215 and/or the clearing house 210). The application function 205 may collect the tag information and service data across one or more tag controllers 215 to enable a service (e.g., tracking). In some examples, the application function 205 may provision or facilitate in provisioning the tag 220 (e.g., out of band).

The tag controller 215 and/or the clearing house 210 may receive tag information and/or enrichment data (e.g., from the tag readers 230). The tag controller 215 and/or the clearing house 210 may collect the tag information and enrichment data across one or more network readers (e.g., network entity 105-a) and/or device readers (e.g., UEs 115-a) (e.g., collectively referred to as "tag readers" 230). The tag controller 215 and/or the clearing house 210 may verify enrichment data and processes used to produce service data. The tag controller 215 may provide or indicate tag information and service data to a tag application (e.g., via the clearing house 210).

The tag reader 230 may transmit a signal (e.g., an energy signal) to the tag 220 (e.g., may be used for energy storage at the tag 220). The tag reader 230 may also receive tag information (e.g., in a response from the tag 220). The tag reader 230 may receive tag information and construct enrichment data, such as a global navigation satellite system (GNSS) location, a neighbor cell identifier (ID), sensor data, and so forth. The tag reader 230 may report tag information and enrichment data to the tag controller 215.

The tag 220 may receive an energy signal to active transmission from the tag 220. The tag 220 may transmit (e.g., after receiving the energy signal) tag information to the tag reader 230. The tag information may include a tag ID and/or other tag-related data. The tag ID and/or the other tag-related data may be protected using a provisioned credential (e.g., via the application function 205). In some examples, some of the workflow may be communicated using a public land mobile network (PLMN) (e.g., PLMN A) associated with a tag controller 215 and/or PLMN B that is associated with a tag controller 215, where each of the tag controllers 215 are associated with respective PLMNs (e.g., a first tag controller associated with the PLMN A and a second tag controller associated with the PLMN B). As an example, the network flow through the PLMN A or the PLMN B may be based on one or more tag readers 230 (e.g., a first tag reader 230 transmits information to a first tag controller 215 and a second tag controller 215 communicating with the tag 220 transmits information to a second tag controller 215).

The ambient wireless device may be associated with security management involving a tag ID and credential management. The tag ID and credential management may include credential management for security and privacy, where tag ID privacy may facilitate avoiding unauthorized tracking or surveillance and a tag ID authentication may facilitate avoiding fraudulent reporting. In some examples, a credential managing entity may include an MNO subscription. However, the tag 220 may not be subscribed to the MNO due to costs, different tags 220 having different security or privacy support based on services, or different tags 220 having different types of credentials. In some examples, credential management may be supported by different devices (e.g., design choice for credential management), where an application function (AF) and/or an application service provider (ASP) manages tag credentials per service security or privacy conditions. The MNO management may directly or indirectly management (e.g., MNO-owned AF) the tag credentials, for example, by verifying the tag ID and filtering or blocking false tag ID reporting or associated traffic. In some examples, the tag 220 security management may involve end-to-end credential management and security protection, as well as MNO verification of the tag ID.

In some examples, such as for the end-to-end security between the tag 220 and an AF associated with the network, the tag information may be verified at AF using either symmetric keys or a protection key (e.g., a private key or a public key) of the AF based on provisioning. The tag controller 215 may indirectly verify tag information via the AF, for example, since registered or requested tag information are validated at the tag controller 215. The AF may register a list of tag IDs and request service data for the list of tag IDs.

The tag controller 215 may provide service data for the registered or requested tag information of the tag IDs, where a charging record is sent to the AF (e.g., reverse charging) and unclaimed tag IDs are considered invalid. The tag information verification at the tag controller 215 may include the AF providing a list of valid tag IDs at a time interval (option 1), where a tag ID length is above a threshold (e.g., 128 bits) to avoid collision while supporting refresh and validity time associated with the tag ID. The tag information verification at the tag controller 215 may include an MNO or a dedicated control channel (DCH) to issue tokens to the AF (option 2), where the tokens are provisioned at the tag 220. The tag 220 may encrypt tokens using the protection key of the tag controller 215 for multiple uses. The tag information verification at the tag controller 215 may include the AF providing a tag information verification key to MNO or the DCH (option 3). The verification may include just the tag ID (e.g., temporary ID) or additional information. However, the tag information verification may involve a protection key and introduce computational complexity at the tag 220.

In some examples, the network may transmit downlink messages to the tag 220, where network may include the tag controller 215 or the AF via the tag controller (e.g., when the tag controller 215 is to send periodic inventory or command messages requested by the AF). The downlink messages from the network may be, for example, a unicast transmission including a command message or a multicast transmission including an inventory message. The command may update a tag configuration or trigger specific action at the tag 220. The inventory message may trigger a response at one or more tags 220, such as a group of tags 220.

Protecting and verifying the downlink message may be difficult for the ambient wireless devices (e.g., ambient IoT (AIoT) passive devices) since a tag 220 (e.g., an AIoT passive device) may not have a shared credential (e.g., subscription credential) with the operator (e.g., MNO) and/ or the tag controller 215. Protecting and verifying the downlink message may also be difficult since the tag 220 may not be registered to the operator network, the tag 220 may not non-volatile memory to store security context that manages states, and/or the downlink message may be triggered or created by the tag controller 215. The techniques discussed herein with respect to at least FIG. 3 and FIG. 4, may provide protecting and verifying downlink messages while reducing these difficulties (e.g., tag 220 does not have to be registered to the operator network, does not have to have storage capacity to store verification details, and so forth).

In the wireless communications system 200, the ambient service components (e.g., the application function 205, the clearing house 210, the tag controller 215, the tag reader 230 including the network entity 105-*a* and/or the UE 115-*a*, and the tag 220) may communicate using a communication link 125. In some examples, the communication link 125 may include a first channel 225-*a* for transmitting data from a first ambient service component to a second ambient service component and a second channel 225-*b* for transmitting data from the second ambient service component to the first ambient service component. The communication link 125 may be an example of a transport layer security (TLS), an NR link, or an LTE link (among other examples) between the ambient service components. The communication link 125 may include a bi-directional link that enables uplink and downlink communications, for example, via the channels 225. For example, a first ambient service component, such as the tag controller 215 may transmit uplink messages 245 (e.g., uplink transmissions), such as uplink control signals or uplink data signals, to the application function 205 using the first channel 225-*a* (e.g., of the communication link 125) and the application function 205 may transmit downlink messages 250 (e.g., downlink transmissions), such as downlink control signals or downlink data signals, to the tag controller 215 using the second channel 225-*b* (e.g., of the communication link 125). In some examples, the downlink messages 250 may be part of control signaling transmitted form the network. Although the techniques described herein, in some examples, describe a tag controller 215 communicating with a tag 220, the techniques described herein may involve an intermediary tag reader 230. For example, the tag controller 215 may communicate with the tag reader 230, which may communicate with the tag 220, and the tag 220 may communicate with the tag reader 230 to communicate (e.g., relay communications) with the tag controller 215. Also, although the techniques described herein, in some examples, describe an application function 205 communicating with a tag controller 215, the techniques described herein may involve the application function 205 communicating with the clearing house 210, which may communicate with the tag controller 215.

In some examples, the application function 205 may provide an end-to-end protection of a downlink command message (e.g., end-to-end protection of command by the application function 205) that is passed through the tag controller 215 using a shared key that is shared with the tag 220 (e.g., ambient wireless device). For example, the application function 205 may secure a downlink message 250 (e.g., command message) using a shared key that is shared with the tag 220. The shared key may provide encryption, integrity protection and replay protection in communications.

In some examples, a freshness of the shared key may be ensured to prevent replay attacks. To provide freshness, a downlink counter may be used. The downlink counter may store a downlink quantity or count of the most recent successful command message. The downlink counter may strictly increase in some examples. To provide freshness, a clock or a timer may be used. A universal time coordinated (UTC) based timer may be used as a freshness parameter. The clock may synchronize with downlink message key sharing to provide precision in refreshing the key. For example, the downlink key refresh may involve refreshing the key for each downlink message 250. The latest key (to be used for the next command message) may be stored at the tag 220 while other keys may not be stored at the tag 220. A random number, which may be generated by the application function 205, may be used as a freshness parameter. A downlink key may be derived from the shared key. In this example, the tag 220 may not have non-volatile memory.

In some examples, the tag controller 215 may provide protection of a downlink message 250 (e.g., command message) using a command protection key (CPK) provided by the application function 205, where the downlink message 250 includes a command verification token (CVT) that is used by the tag 220 to verify authorization of the tag controller 215 for the downlink message 250 (e.g., command message) (e.g., tag controller protection of command with authorization proof token).

The application function 205 may provision a verifiable CVT at the tag 220, for example, using a protection key (PK) of the application function or a shared secret. The verifiable CVT may ensure that the command message (e.g., downlink message 250) is generated by an authorized tag controller 215, and includes authorization information of the tag controller 215.

In some examples, the application function 205 may provide the CPK at the tag controller 215 (e.g., rather than directly to the tag 220), and the CPK may be derived from a shared key between the application function 205 and the tag 220. The CPK may be specific to a PLMN (or a particular tag controller 215), and the PLMN and/or the tag controller 215 may have a limited session in the workflow, in some examples. The CPK for the PLMN or the tag controller 215 may be associated with a network ID or a PLMN ID, as well as a maximum downlink counter, which may be part of the CVT. If the same CPK is used by multiple PLMNs, the authorized PLMNs may be listed in the token.

The tag controller 215 may secure the downlink messages 250 (e.g., command messages) using the CPK. The downlink messages 250 may use or incorporate freshness parameters for further message security (e.g., message protection), where the freshness parameter may be a counter, a random number, and/or a unique network parameter. For example, repetition of the unique network parameter may be detected by the tag 220 (e.g., and the entire downlink message 250 may be discarded) or in some examples, the repetition may not impact the validity of the tag 220.

The downlink message 250 may include the CVT, and in some examples, may be included in the downlink message 250 in one instance. For example, the CVT may be included in the downlink message 250 when the CPK is first used. The tag controller 215 may obtain a new CVT after expiry or exceeding a usage threshold of the CVT. The CVT provisioning may occur at the tag 220 (e.g., for initial and updated CVTs).

In some examples, the tag controller 215 may provide protection of a downlink message 250 (e.g., command message) using a CPK provided by the application function 205. The tag controller 215 may sign the downlink command message 250 using a signing key (e.g., private key associated with a certificate (or a verification key)) (e.g., tag controller protection of command with signature for enhanced authorization proof). The certificate (or verification key) may be provisioned at the tag 220 by the application function 205 and may be used by the tag 220 to verify the CPK of the downlink message 250. A signature may provide assurance to the tag 220 that downlink message 250 is sent by an authorized tag controller 215. For example, the CPK may be used to protect the downlink message 250 (e.g., the command message) and the signing key, which may be a private key associated with a certificate or may be a verification key, may be associated with a private key or certificate of a tag controller 215. The tag controller 215 may use the signing key to sign the protected or encoded message again in order to prove identity of the tag controller 215 to the tag 220 (e.g., tag verifies authorized tag controller 215).

The application function 205 may provision a PK or a certificate of the tag controller 215 at the tag 220. The PK or certificate may be time-dependent, such that the PK or certification are valid for a threshold time. The application function 205 may provide a CPK to the tag controller 215. The CPK may be derived from a shared key between the application function 205 and the tag 220, so that the tag 220 may authenticate a message from the tag controller 215 based on the same CPK. The CPK may be specific to a PLMN or a tag controller 215, and may expire after a threshold time. The CPK being the PLMN may be implemented using a network ID or a PLMN ID along with a downlink counter, which may be part of the CVT. In some examples, if the CPK is to be used for multiple PLMNs, then the PLMN ID may not be part of the CPK derivation. The tag controller 215 may secure the downlink message 250 (e.g., a command message) using the CPK. The tag controller 215 may sign the downlink message 250 using the key associated with PK or certificate, for example, in a first downlink message 250. The signature verification may validate the CPK, which may not be used for each downlink message 250 (e.g., subsequent downlink messages 250 after the first downlink message 250).

The authorization token, which may be associated with the signature verification key, may be included in the signed message to avoid direct token provisioning at the tag 220. To provide tag controller 215 protection of a downlink message 250 with a signature may involve a PK or certificate provisioning of authorized tag controller 215 or PLMN.

In some examples, the tag controller 215 may provide protection of a downlink message 250 (e.g., command message) using a CPK that is generated by the tag controller 215 (e.g., tag controller 215 protection of downlink message 250 with its own key). In such examples, the application function 205 may provision a PK or certificate of the tag controller 215 at the tag 220. The PK or certificate may time-dependent. The tag controller 215 may generate the CPK and obtain a renewal token from the application function 205. A token may be an encrypted CPK with additional authorization information, such as a PLMN ID, a tag controller ID, an associated expiration time threshold, allowed commands, and so forth, that is provided by the application function 205. Upon expiration of the CPK, the tag controller 215 may obtain a renewal token from the application function 205 (e.g., token=Enc (shared key (SK), CPK, freshness parameter, authorization information, and so forth) where the SK is a shared key between the application function 205 and the tag 220.

The tag controller 215 may protect the downlink messages 250 (e.g., command messages) using the CPK. The downlink message 250 may include a (renewal) token, and the token may not be encrypted since it is used to derive the CPK. The tag controller 215 may sign the downlink message 250 using the tag controller 215 PK or certificate. The tag controller 215 may sign for the first downlink message 250 but not subsequent downlink messages 250. The downlink message 250 may include the token issued from the application function 205. The signature may provide an indication of authorized use of the CPK (e.g., authorized transmitting device). Accordingly, direct token provisioning by the application function 205 may not be used. For the tag controller 215 to protect a downlink message 250 with a generated key, a PK or certificate provisioning of the authorized tag controller 215 or PLMN may occur.

In some examples, the tag controller 215 may provide, for example in a multicast transmission, a downlink inventory message to multiple tags 220 (e.g., secure inventor or paging). The tag controller 215 may receive a group key and the tag controller 215 may derive an inventory key. The tag controller 215 may protect the downlink inventory message using the inventory key, which is used by the tag 220 to verify authorization of the tag controller 215.

In such examples, a group key, $K_G$, may be provisioned at the multiple tags 220. The group may include a group of tags 220 that may respond to specific inventory downlink messages 250. An inventory key (for group signaling), $K_{INV}$, may be derived from the group key. For example, the $K_{INV}$=KDF ($K_G$, parameters), where the parameters include PLM information, frequency band information, time, frame number, and so forth. In some examples, the parameters may include a group ID that is provisioned at the tags 220. The $K_{INV}$ refresh period may also be provisioned at the tags 220.

The $K_{INV}$ may be used to protect the inventory downlink message 250 to or create key-dependent waveforms. One or more freshness parameters (e.g., timer, counter or random number) may be incorporated in securing the inventory downlink message 250 or waveform generation to avoid replay attacks. The tag 220 may respond to the inventory message after verification using $K_{INV}$. When a random number is used as a freshness parameter, the tag 220 may implement a replay protection mechanism.

Figure 3:
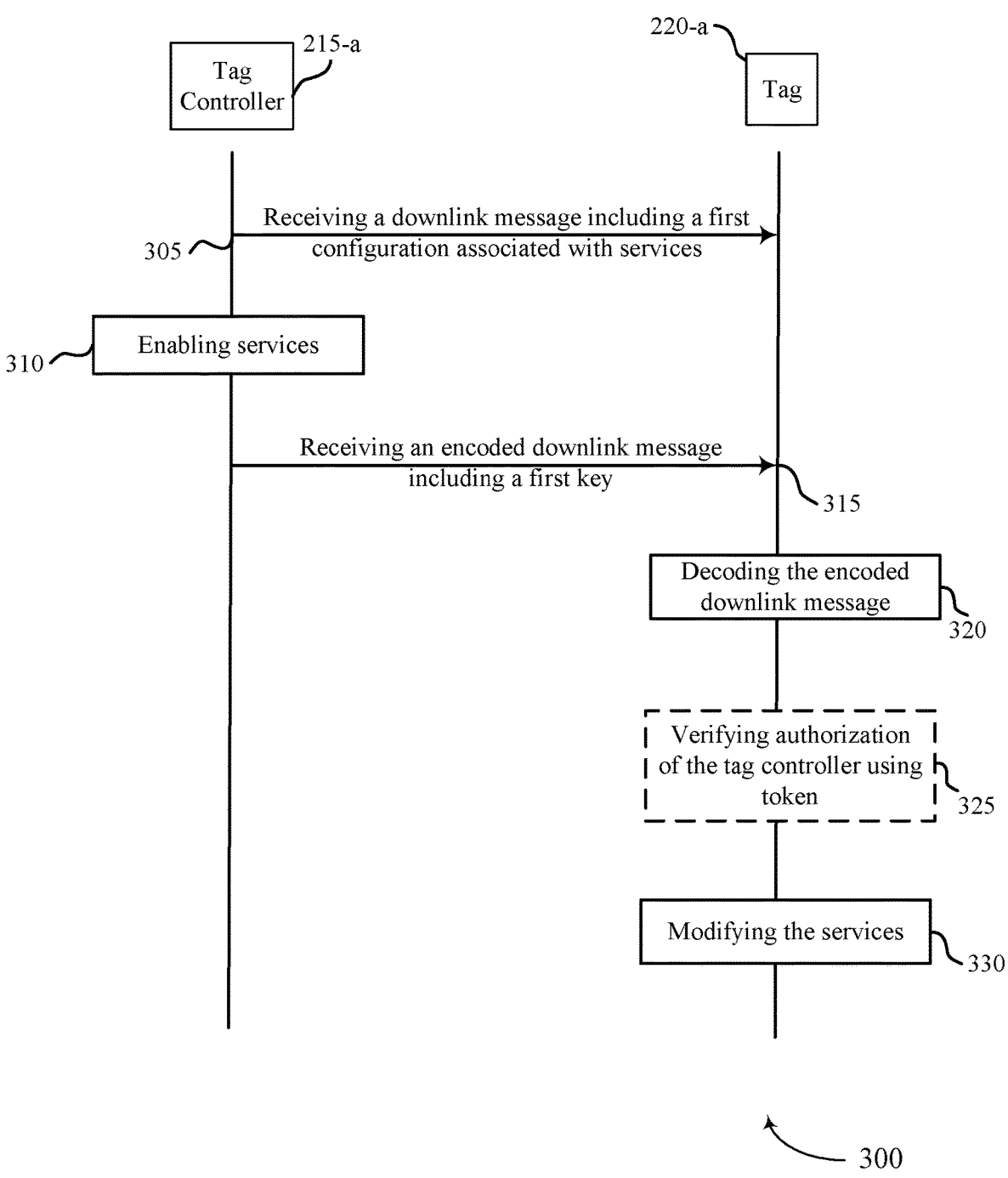
FIG. 3 shows an example of a process flow that supports downlink message protection for ambient wireless devices in accordance with one or more aspects of the present disclosure.

FIG. 3 shows an example of a process flow 300 that supports downlink message protection for ambient wireless devices in accordance with one or more aspects of the present disclosure. The flow 300 may implement aspects of or may be implemented by aspects of the wireless communications system 100 or the wireless communications system 200. For example, the process flow 300 may include a tag controller 215-a and a tag 220-a, which may be an example of a tag controller 215 and a tag 220 as described herein. In the following description of the process flow 300, the operations performed by the tag controller 215-a and the tag 220-a, may be performed in different orders or at different times than the exemplary order shown. Some operations may also be omitted from the process flow 300, or other operations may be added to the process flow 300. Further, while operations in the process flow 300 are illustrated as being performed by the tag controller 215-a and/or the tag 220-a, the examples herein are not to be construed as limiting, as the described features may be associated with and/or performed by any quantity of different devices including devices other than the tag controller 215-a and/or the tag 220-a as applicable.

At 305, the tag 220-a (e.g., ambient wireless device) may receive a downlink message including a first configuration for the ambient wireless device associated with one or more services (e.g., ambient wireless communications-related services). The one or more services may be associated with location or tracking.

At 310, the tag controller 215-a may enable the one or more services at the tag 220-a based on the first configuration. At 315, the tag 220-a may receive an encoded downlink message including a first key. Receiving the encoded downlink message may be based on a change to the one or more configurations for services, a requested response transmission from the ambient wireless device, or both. Receiving the encoded downlink message may include receiving the encoded downlink message from the tag controller 215-a associated with a network entity 105, where the encoded downlink message includes a signature. Receiving the encoded downlink message may include verifying authorization of the tag controller 215-a to transmit the encoded downlink message to the tag 220 based on the signature.

At 320, the tag 220-a may decode the encoded downlink message based on a second key. The encoded downlink message may include a second configuration. The first key and the second key may be for example a single shared key between the ambient wireless device and an application function 205 associated with a network entity 105. In some examples, the second key may be based on a shared key between the tag 220 and an application function 205 associated with a network entity 105. In some examples, the second key may be associated with one or more key refresh parameters. In some examples, the encoded downlink message may include a token. Receiving the encoded downlink message may include receiving the encoded downlink message from the tag controller 215-a associated with a network entity 105, via one or more UEs 115, and verifying authorization of the tag controller 215-a to transmit the encoded downlink message to the tag 220 based on the token. In some examples, the second key may be generated by a tag controller 215-a associated with a network entity 105. In some examples, the second key may be generated by an application function 205 associated with a network entity 105.

In some examples, at 325, decoding the encoded downlink message may include decoding the encoded downlink message based on the second key and a third key, where third key includes a group key associated with multiple tags 220 and the second key includes an inventory key associated with the tag 220.

At 330, the tag 220 may modify the one or more services or activate a response transmission associated with the tag 220-*a* based on the second configuration. The inventory key may be based on the group key in some examples.

Figure 4:
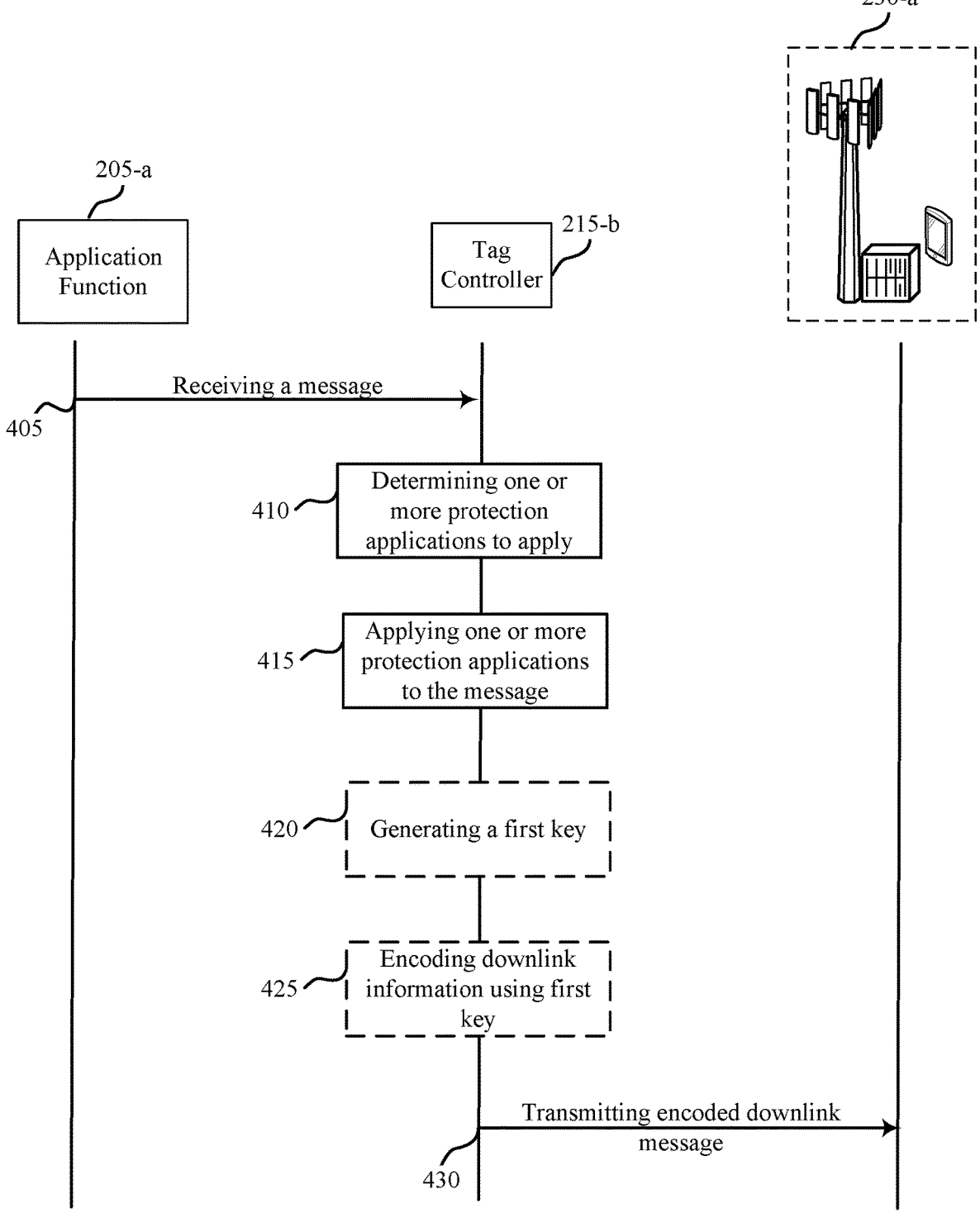
FIG. 4 shows an example of a process flow that supports downlink message protection for ambient wireless devices in accordance with one or more aspects of the present disclosure.

FIG. 4 shows an example of a process flow 400 that supports downlink message protection for ambient wireless devices in accordance with one or more aspects of the present disclosure. The flow 400 may implement aspects of or may be implemented by aspects of the wireless communications system 100 or the wireless communications system 200. For example, the process flow 400 may include an application function 205-*a*, a tag controller 215-*b*, and a tag reader 230-*a*, which may be an example of an application function 205, a tag controller 215, and a tag reader 230, as described herein. In the following description of the process flow 400, the operations performed by the application function 205-*a*, the tag controller 215-*b*, and the tag reader 230-*a*, may be performed in different orders or at different times than the exemplary order shown. Some operations may also be omitted from the process flow 400, or other operations may be added to the process flow 400. Further, while operations in the process flow 400 are illustrated as being performed by the application function 205-*a*, the tag controller 215-*b*, and the tag reader 230-*a*, the examples herein are not to be construed as limiting, as the described features may be associated with any quantity of different devices.

At 405, the tag controller 215-*b* may receive a message from an application function 205-*a* associated with a network entity 105. The message includes the encoded downlink message, a downlink information for the encoded downlink message, a first key, a token, or any combination thereof. A first key of the message may be based on a shared key between the one or more tags 220 and the application function 205-*a*. A first key of the message may be associated with one or more key refresh parameters.

At 410, the tag controller 215-*b* may determine one or more protection applications to apply to the message. The one or more protection applications include one or more command protection applications, one or more inventory protection applications, or a combination thereof.

At 415, the tag controller 215-*b* may apply the one or more protection applications to the message to obtain an encoded downlink message. The encoded downlink message may include a token of the message. Applying the one or more protection applications may include encoding downlink information of the message using a first key of the message from the application function 205-*a*, and transmitting the encoded downlink message for the one or more tags 220.

In some examples, applying the one or more protection applications includes the tag controller 215-*b* receiving an authorization token and a first key from the application function 205-*a*, encoding downlink information of the message using the first key, signing the encoded downlink information using a signature key of the message, and transmitting the encoded downlink message for the one or more tags 220.

In some examples, applying the one or more protection applications includes at 420, generating a first key, and at 425, encoding downlink information of the message using the first key, and transmitting the encoded downlink message for the one or more tags 220. In some examples, applying the one or more protection applications includes receiving a group key from the application function 205-*a*, the group key associated with at least the one or more tags 220, encoding downlink information of the message using an inventory key based on the group key, and transmitting the encoded downlink message for the one or more tags 220.

At 430, the tag controller 215-*b* may transmit, to the tag reader 230-*a*, for one or more ambient wireless devices, the encoded downlink message. Transmitting the encoded downlink message may be based on a change to one or more configurations for services provided by the one or more tags 220, a requested response transmission from the one or more tags 220, or both. In some examples, transmitting the encoded downlink message may include transmitting the encoded downlink message to one or more UEs 115 associated with the one or more tags 220. The one or more UEs 115 may include a network reader, a device reader, or both.

Figure 5:
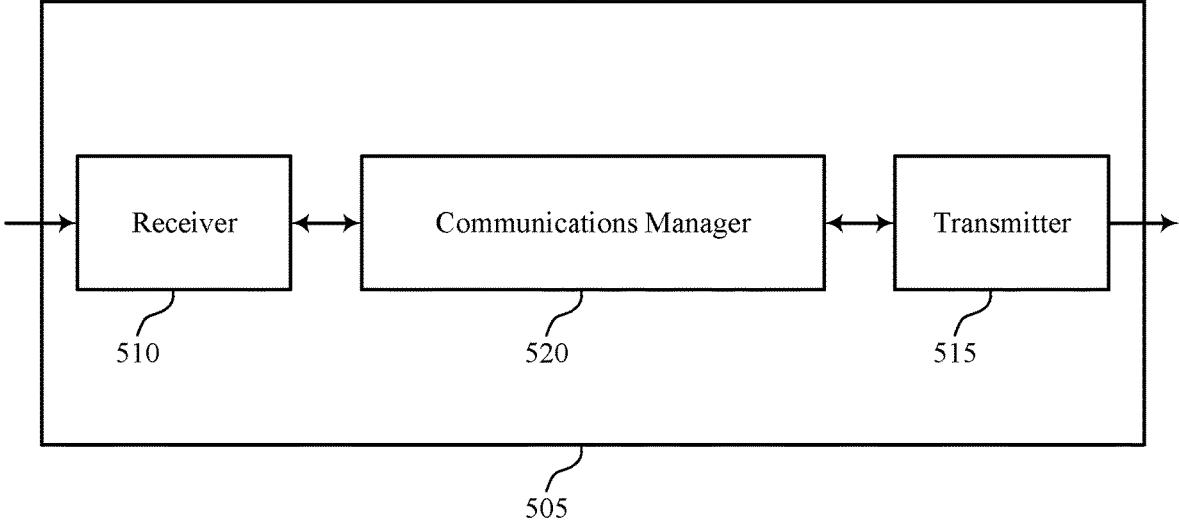
FIGS. 5 and 6 show block diagrams of devices that support downlink message protection for ambient wireless devices in accordance with one or more aspects of the present disclosure.

FIG. 5 shows a block diagram 500 of a device 505 that supports downlink message protection for ambient wireless devices in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to downlink message protection for ambient wireless devices). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to downlink message protection for ambient wireless devices). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of downlink message protection for ambient wireless devices as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), a graphics processing unit (GPU), a neural processing unit (NPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in hardware, software (e.g., executed by a processor), or any combination thereof executed by at least one processor. If implemented in code executed by at least one processor (e.g., processor-executable code), the functions of the communications manager 520, the receiver 510, the transmitter 515, or various combinations or components thereof may be performed by a general-purpose processor, a DSP, a CPU, a GPU, a NPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving a downlink message including a first configuration for the ambient wireless device associated with one or more services. The communications manager 520 is capable of, configured to, or operable to support a means for enabling the one or more services at the ambient wireless device based on the first configuration. The communications manager 520 is capable of, configured to, or operable to support a means for receiving an encoded downlink message including a first key. The communications manager 520 is capable of, configured to, or operable to support a means for decoding the encoded downlink message based on a second key, the encoded downlink message including a second configuration. The communications manager 520 is capable of, configured to, or operable to support a means for modifying the one or more services or activate a response transmission associated with the ambient wireless device based on the second configuration.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for facilitating efficiently securing downlink messages transmitted from the network (e.g., via an application function of the network) to the ambient wireless device without having to form a secure connection between the network and the ambient wireless device, for example, where the secure connection is associated with complex processes and/or a large quantity of storage space for storing verification-related data.

Figure 6:
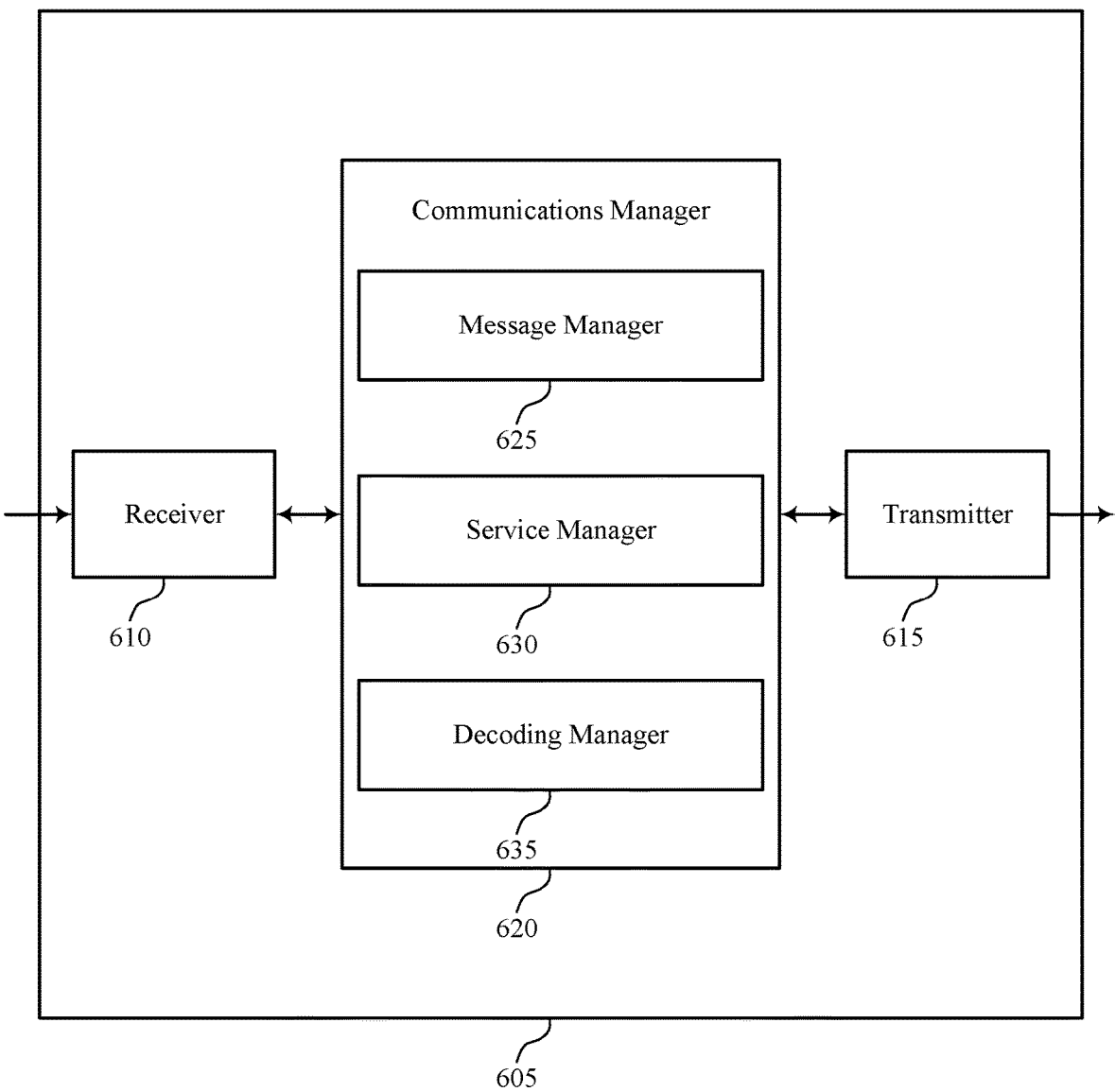

FIG. 6 shows a block diagram 600 of a device 605 that supports downlink message protection for ambient wireless devices in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to downlink message protection for ambient wireless devices). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to downlink message protection for ambient wireless devices). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of downlink message protection for ambient wireless devices as described herein. For example, the communications manager 620 may include a message manager 625, a service manager 630, a decoding manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The message manager 625 is capable of, configured to, or operable to support a means for receiving a downlink message including a first configuration for the ambient wireless device associated with one or more services. The service manager 630 is capable of, configured to, or operable to support a means for enabling the one or more services at the ambient wireless device based on the first configuration. The message manager 625 is capable of, configured to, or operable to support a means for receiving an encoded downlink message including a first key. The decoding manager 635 is capable of, configured to, or operable to support a means for decoding the encoded downlink message based on a second key, the encoded downlink message including a second configuration. The service manager 630 is capable of, configured to, or operable to support a means for modifying the one or more services or activating a response transmission associated with the ambient wireless device based on the second configuration.

Figure 7:
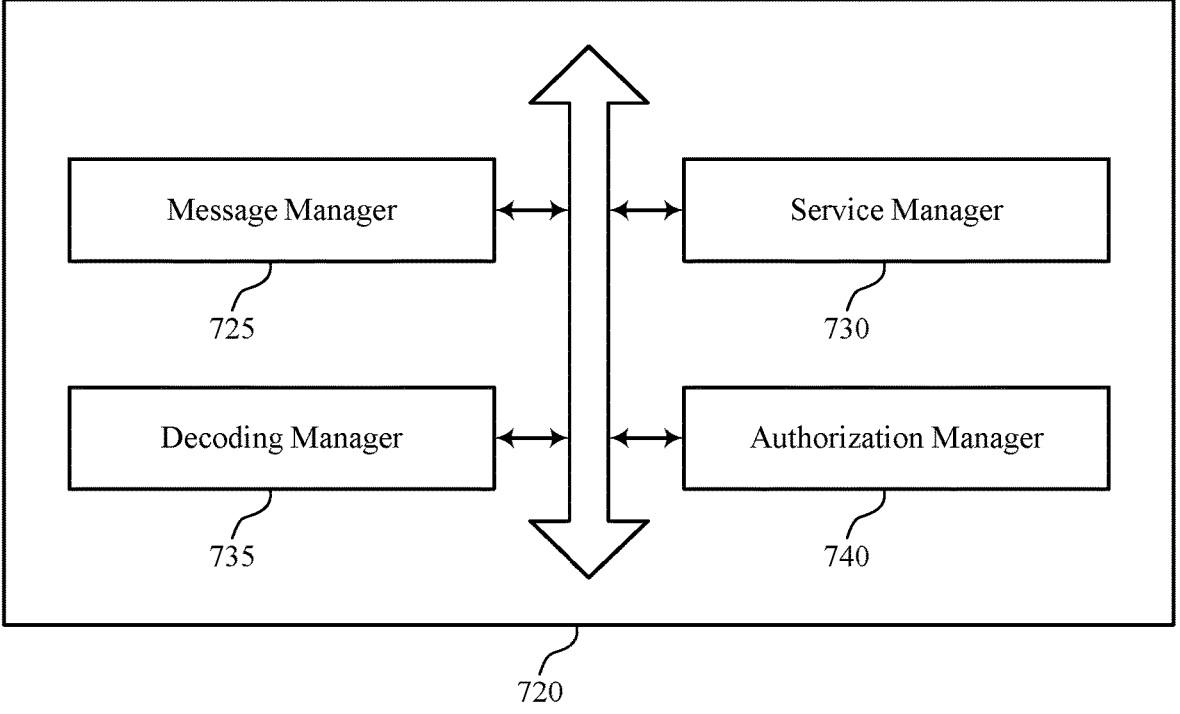
FIG. 7 shows a block diagram of a communications manager that supports downlink message protection for ambient wireless devices in accordance with one or more aspects of the present disclosure.

FIG. 7 shows a block diagram 700 of a communications manager 720 that supports downlink message protection for ambient wireless devices in accordance with one or more aspects of the present disclosure. The communications manager 720 may be an example of aspects of a communications manager 520, a communications manager 620, or both, as described herein. The communications manager 720, or various components thereof, may be an example of means for performing various aspects of downlink message protection for ambient wireless devices as described herein. For example, the communications manager 720 may include a message manager 725, a service manager 730, a decoding manager 735, an authorization manager 740, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The message manager 725 is capable of, configured to, or operable to support a means for receiving a downlink message including a first configuration for the ambient wireless device associated with one or more services. The service manager 730 is capable of, configured to, or operable to support a means for enabling the one or more services at the ambient wireless device based on the first configuration. In some examples, the message manager 725 is capable of, configured to, or operable to support a means for receiving an encoded downlink message including a first key. The decoding manager 735 is capable of, configured to, or operable to support a means for decoding the encoded downlink message based on a second key, the encoded downlink message including a second configuration. In some examples, the service manager 730 is capable of, configured to, or operable to support a means for modifying the one or more services or activating a response transmission associated with the ambient wireless device based on the second configuration.

In some examples, receiving the encoded downlink message is based on a change to the one or more configurations for services, a requested response transmission from the ambient wireless device, or both.

In some examples, the first key and the second key are a single shared key between the ambient wireless device and an application function associated with a network entity.

In some examples, the second key is based on a shared key between the ambient wireless device and an application function associated with a network entity.

In some examples, the second key is associated with one or more key refresh parameters.

In some examples, the encoded downlink message includes a token.

In some examples, to support receiving the encoded downlink message, the message manager 725 is capable of, configured to, or operable to support a means for receiving the encoded downlink message from an ambient wireless controller associated with a network entity, via one or more UEs. In some examples, to support receiving the encoded downlink message, the authorization manager 740 is capable of, configured to, or operable to support a means for verifying authorization of the ambient wireless controller to transmit the encoded downlink message to the ambient wireless device based on the token.

In some examples, decoding the encoded downlink message is based on verifying authorization of the ambient wireless controller using the token.

In some examples, the second key is generated by an ambient wireless controller associated with a network entity.

In some examples, the second key is generated by an application function associated with a network entity.

In some examples, to support receiving the encoded downlink message, the message manager 725 is capable of, configured to, or operable to support a means for receiving the encoded downlink message from an ambient wireless controller associated with a network entity, where the encoded downlink message includes a signature. In some examples, to support receiving the encoded downlink message, the authorization manager 740 is capable of, configured to, or operable to support a means for verifying authorization of the ambient wireless controller to transmit the encoded downlink message to the ambient wireless device based on the signature.

In some examples, the one or more services are associated with location or tracking.

In some examples, to support decoding the encoded downlink message, the decoding manager 735 is capable of, configured to, or operable to support a means for decoding the encoded downlink message based on the second key and a third key, where the third key includes a group key associated with a set of multiple ambient wireless devices and the second key includes an inventory key associated with the ambient wireless device.

In some examples, the inventory key is based on the group key.

Figure 8:
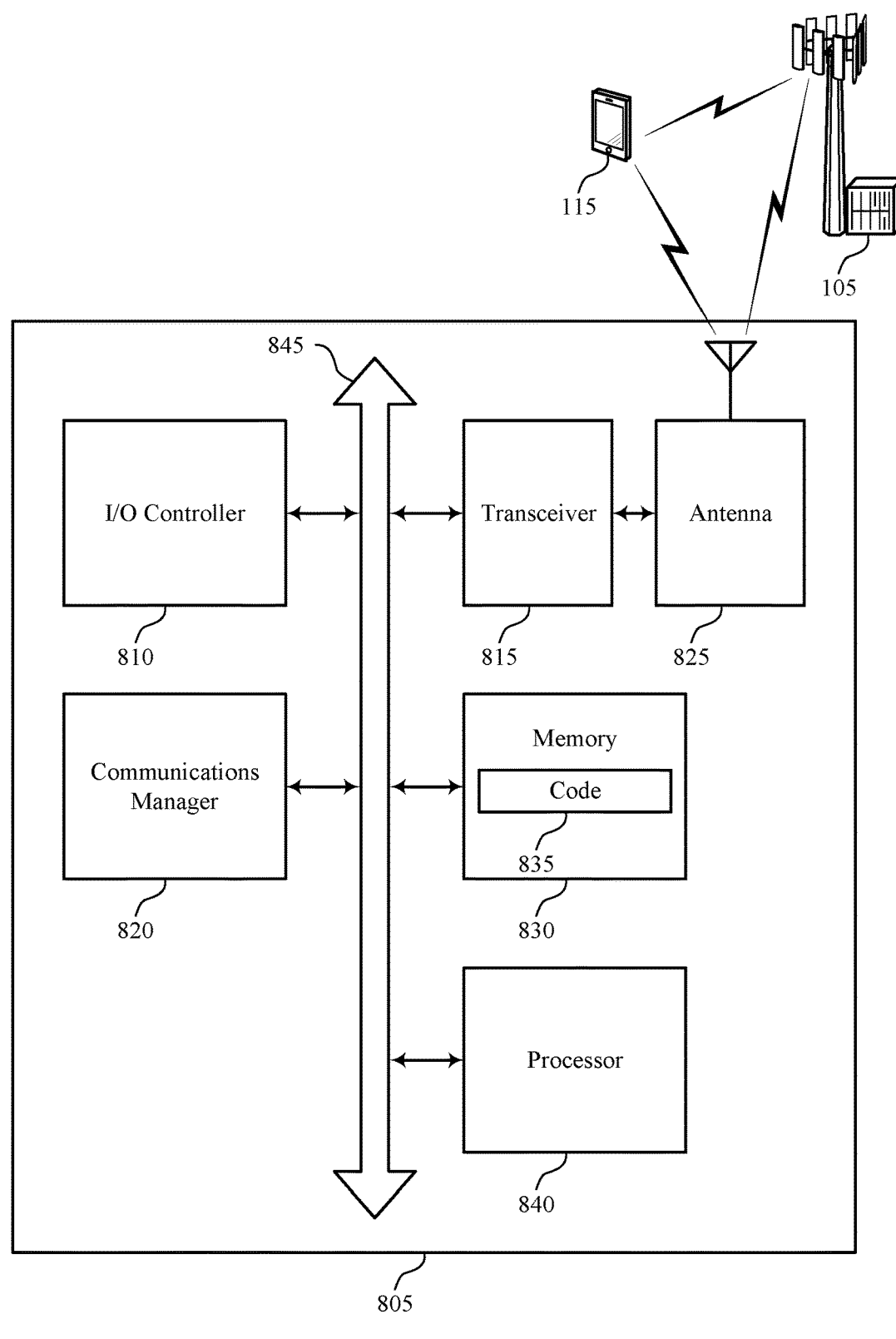
FIG. 8 shows a diagram of a system including a device that supports downlink message protection for ambient wireless devices in accordance with one or more aspects of the present disclosure.

FIG. 8 shows a diagram of a system 800 including a device 805 that supports downlink message protection for ambient wireless devices in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835 (e.g., processor-executable code), and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 (e.g., processor-executable code) including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting downlink message protection for ambient wireless devices). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for receiving a downlink message including a first configuration for the ambient wireless device associated with one or more services. The communications manager 820 is capable of, configured to, or operable to support a means for enabling the one or more services at the ambient wireless device based on the first configuration. The communications manager 820 is capable of, configured to, or operable to support a means for receiving an encoded downlink message including a first key. The communications manager 820 is capable of, configured to, or operable to support a means for decoding the encoded downlink message based on a second key, the encoded downlink message including a second configuration. The communications manager 820 is capable of, configured to, or operable to support a means for modifying the one or more services or activating a response transmission associated with the ambient wireless device based on the second configuration.

By including or configuring the communications manager 820 in accordance with examples as described herein, the device 805 may support techniques for facilitating efficiently securing downlink messages transmitted from the network (e.g., via an application function of the network) to the ambient wireless device without having to form a secure connection between the network and the ambient wireless device, for example, where the secure connection is associated with complex processes and/or a large quantity of storage space for storing verification-related data.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of downlink message protection for ambient wireless devices as described herein, or the at least one processor 840 and the at least one memory 830 may be otherwise configured to, individually or collectively, perform or support such operations.

Figure 9:
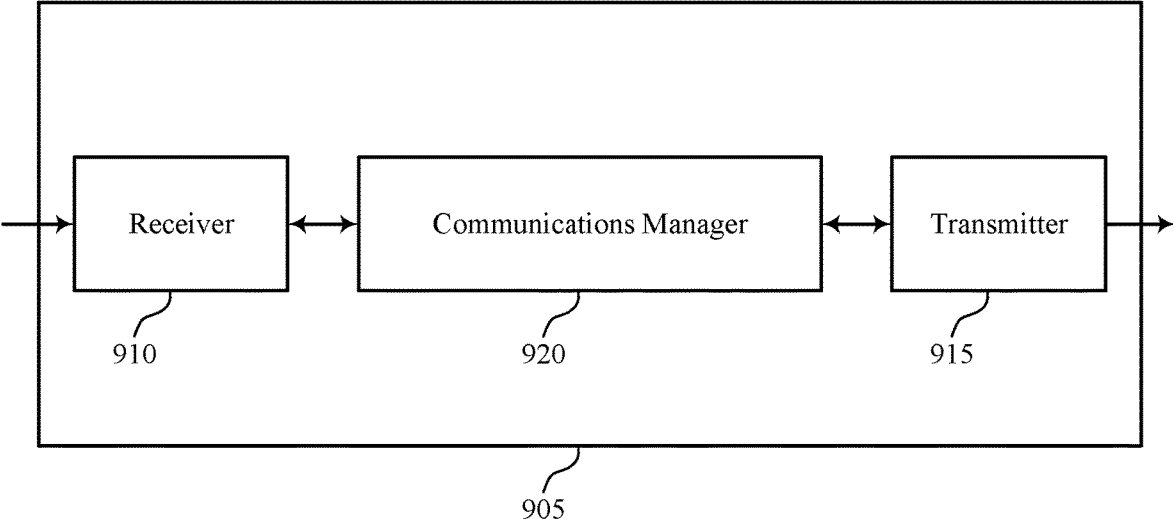
FIGS. 9 and 10 show block diagrams of devices that support downlink message protection for ambient wireless devices in accordance with one or more aspects of the present disclosure.

FIG. 9 shows a block diagram 900 of a device 905 that supports downlink message protection for ambient wireless devices in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of downlink message protection for ambient wireless devices as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, a GPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software) executed by at least one processor. If implemented in code executed by at least one processor, the functions of the communications manager 920, the receiver 910, the transmitter 915, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for receiving a message from an application function associated with a network entity. The communications manager 920 is capable of, configured to, or operable to support a means for determining one or more protection applications to apply to the message. The communications manager 920 is capable of, configured to, or operable to support a means for applying the one or more protection applications to the message to obtain an encoded downlink message. The communications manager 920 is capable of, configured to, or operable to support a means for transmitting, for one or more ambient wireless devices, the encoded downlink message.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for facilitating efficiently securing downlink messages transmitted from the network (e.g., via an application function of the network) to the ambient wireless device without having to form a secure connection between the network and the ambient wireless device, for example, where the secure connection is associated with complex processes and/or a large quantity of storage space for storing verification-related data.

Figure 10:
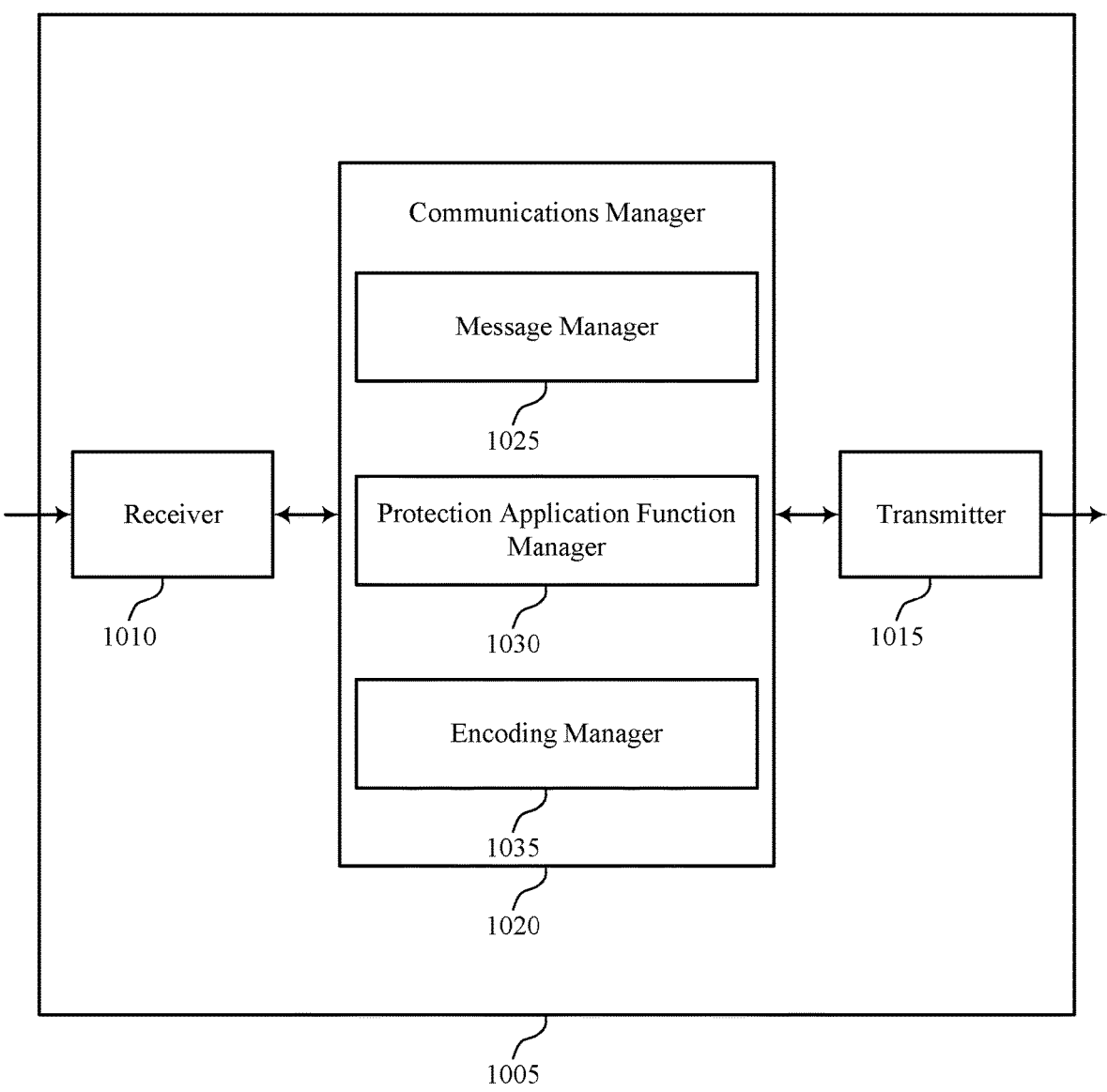

FIG. 10 shows a block diagram 1000 of a device 1005 that supports downlink message protection for ambient wireless devices in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of downlink message protection for ambient wireless devices as described herein. For example, the communications manager 1020 may include a message manager 1025, a protection application function manager 1030, an encoding manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The message manager 1025 is capable of, configured to, or operable to support a means for receiving a message from an application function associated with a network entity. The protection application function manager 1030 is capable of, configured to, or operable to support a means for determining one or more protection applications to apply to the message. The encoding manager 1035 is capable of, configured to, or operable to support a means for applying the one or more protection applications to the message to obtain an encoded downlink message. The message manager 1025 is capable of, configured to, or operable to support a means for transmitting, for one or more ambient wireless devices, the encoded downlink message.

Figure 11:
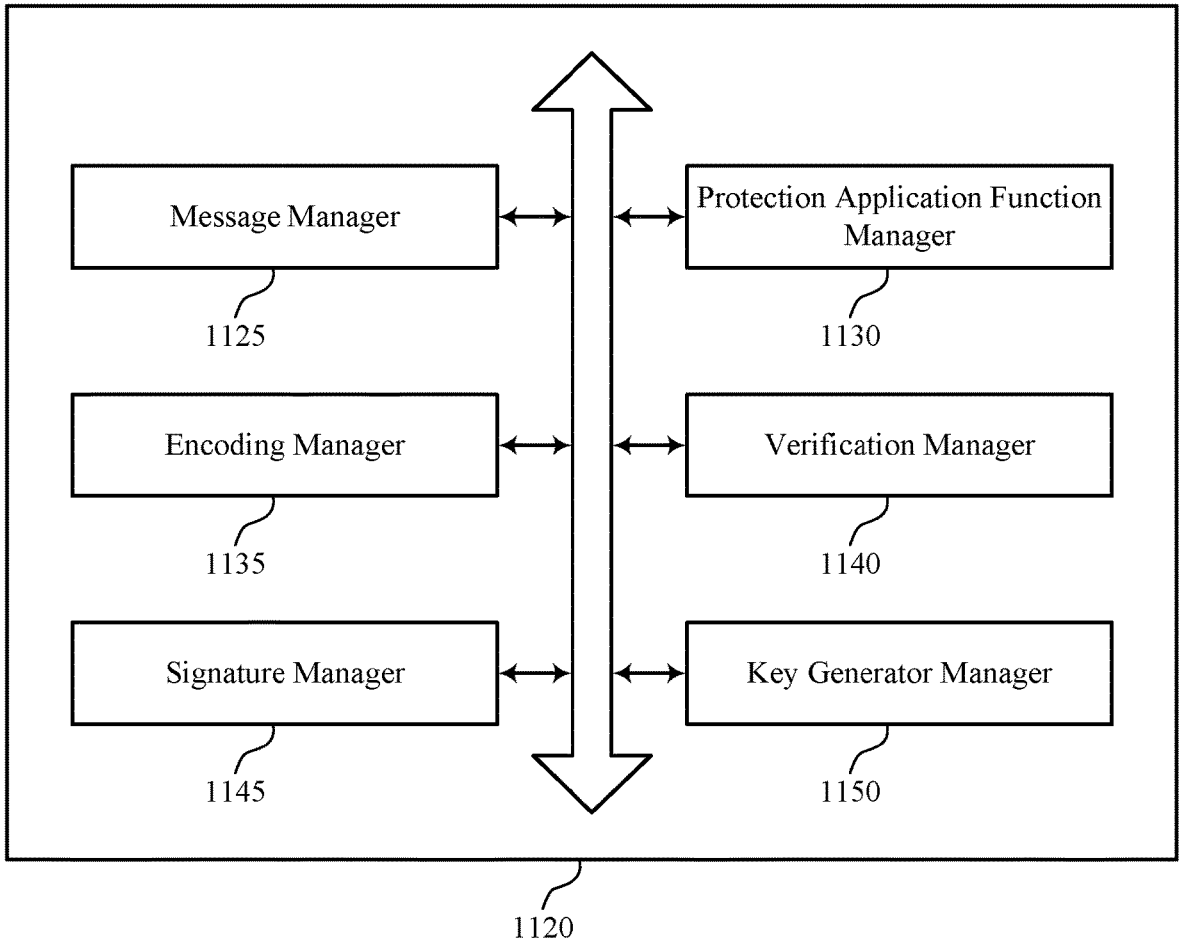
FIG. 11 shows a block diagram of a communications manager that supports downlink message protection for ambient wireless devices in accordance with one or more aspects of the present disclosure.

FIG. 11 shows a block diagram 1100 of a communications manager 1120 that supports downlink message protection for ambient wireless devices in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of downlink message protection for ambient wireless devices as described herein. For example, the communications manager 1120 may include a message manager 1125, a protection application function manager 1130, an encoding manager 1135, a verification tag manager 1140, a signature tag manager 1145, a key generator manager 1150, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The message manager 1125 is capable of, configured to, or operable to support a means for receiving a message from an application function associated with a network entity. The protection application function manager 1130 is capable of, configured to, or operable to support a means for determining one or more protection applications to apply to the message. The encoding manager 1135 is capable of, configured to, or operable to support a means for applying the one or more protection applications to the message to obtain an encoded downlink message. In some examples, the message manager 1125 is capable of, configured to, or operable to support a means for transmitting, for one or more ambient wireless devices, the encoded downlink message.

In some examples, the message includes the encoded downlink message, a downlink information for the encoded downlink message, a first key, a token, or any combination thereof.

In some examples, the one or more protection applications include one or more command protection applications, one or more inventory protection applications, or a combination thereof.

In some examples, transmitting the encoded downlink message is based on a change to one or more configurations for services provided by the one or more ambient wireless devices, a requested response transmission from the one or more ambient wireless devices, or both.

In some examples, a first key of the message is based on a shared key between the one or more ambient wireless devices and the application function.

In some examples, a first key of the message is associated with one or more key refresh parameters.

In some examples, the encoded downlink message includes a token of the message.

In some examples, to support transmitting the encoded downlink message, the message manager 1125 is capable of, configured to, or operable to support a means for transmitting the encoded downlink message to one or more UEs associated with the one or more ambient wireless devices.

In some examples, the one or more UEs include a network reader, a device reader, or both.

In some examples, to support applying the one or more protection applications, the encoding manager 1135 is capable of, configured to, or operable to support a means for encoding downlink information of the message using a first key of the message from the application function. In some examples, to support applying the one or more protection applications, the message manager 1125 is capable of, configured to, or operable to support a means for transmitting the encoded downlink message for the one or more ambient wireless devices.

In some examples, to support applying the one or more protection applications, the verification manager 1140 is capable of, configured to, or operable to support a means for receiving an authorization token and a first key from the application function. In some examples, to support applying the one or more protection applications, the encoding manager 1135 is capable of, configured to, or operable to support a means for encoding downlink information of the message using the first key of the message. In some examples, to support applying the one or more protection applications, the signature manager 1145 is capable of, configured to, or operable to support a means for signing the encoded downlink information using a signing key of the message, where the signed encoded downlink formation includes the authorization token. In some examples, to support applying the one or more protection applications, the message manager 1125 is capable of, configured to, or operable to support a means for transmitting the encoded downlink message for the one or more ambient wireless devices.

In some examples, to support applying the one or more protection applications, the key generator manager 1150 is capable of, configured to, or operable to support a means for generating a first key. In some examples, to support applying the one or more protection applications, the encoding manager 1135 is capable of, configured to, or operable to support a means for encoding downlink information of the message using the first key. In some examples, to support applying the one or more protection applications, the message manager 1125 is capable of, configured to, or operable to support a means for transmitting the encoded downlink message for the one or more ambient wireless devices.

In some examples, to support applying the one or more protection applications, the message manager 1125 is capable of, configured to, or operable to support a means for receiving a group key from the application function, the group key associated with at least the one or more ambient wireless devices. In some examples, to support applying the one or more protection applications, the encoding manager 1135 is capable of, configured to, or operable to support a means for encoding downlink information of the message using an inventory key based on the group key. In some examples, to support applying the one or more protection applications, the message manager 1125 is capable of, configured to, or operable to support a means for transmitting the encoded downlink message for the one or more ambient wireless devices.

Figure 12:
FIG. 12 shows a diagram of a system including a device that supports downlink message protection for ambient wireless devices in accordance with one or more aspects of the present disclosure.

FIG. 12 shows a diagram of a system 1200 including a device 1205 that supports downlink message protection for ambient wireless devices in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting downlink message protection for ambient wireless devices). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. For example, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code

1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for receiving a message from an application function associated with a network entity. The communications manager 1220 is capable of, configured to, or operable to support a means for determining one or more protection applications to apply to the message. The communications manager 1220 is capable of, configured to, or operable to support a means for applying the one or more protection applications to the message to obtain an encoded downlink message. The communications manager 1220 is capable of, configured to, or operable to support a means for transmitting, for one or more ambient wireless devices, the encoded downlink message.

By including or configuring the communications manager 1220 in accordance with examples as described herein, the device 1205 may support techniques for facilitating efficiently securing downlink messages transmitted from the network (e.g., via an application function of the network) to the ambient wireless device without having to form a secure connection between the network and the ambient wireless device, for example, where the secure connection is associated with complex processes and/or a large quantity of storage space for storing verification-related data.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of downlink message protection for ambient wireless devices as described herein, or the at least one processor 1235 and the at least one memory 1225 may be otherwise configured to, individually or collectively, perform or support such operations.

FIG. 13 shows a flowchart illustrating a method 1300 that supports downlink message protection for ambient wireless devices in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a downlink message including a first configuration for the ambient wireless device associated with one or more services. The operations of block 1305 may be performed in accordance with examples as disclosed herein. In some examples, aspects of the operations of 1305 may be performed by a message manager 725 as described with reference to FIG. 7.

At 1310, the method may include enabling the one or more services at the ambient wireless device based at least in part on the first configuration. The operations of block 1310 may be performed in accordance with examples as disclosed herein. In some examples, aspects of the operations of 1310 may be performed by a service manager 730 as described with reference to FIG. 7.

At 1315, the method may include receiving an encoded downlink message including a first key. The operations of block 1315 may be performed in accordance with examples as disclosed herein. In some examples, aspects of the operations of 1315 may be performed by a message manager 725 as described with reference to FIG. 7.

At 1320, the method may include decoding the encoded downlink message based at least in part on a second key, the encoded downlink message including a second configuration. The operations of block 1320 may be performed in accordance with examples as disclosed herein. In some examples, aspects of the operations of 1320 may be performed by a decoding manager 735 as described with reference to FIG. 7.

At 1325, the method may include modifying the one or more services or activating a response transmission associated with the ambient wireless device based at least in part on the second configuration. The operations of block 1325 may be performed in accordance with examples as disclosed herein. In some examples, aspects of the operations of 1325 may be performed by a service manager 730 as described with reference to FIG. 7.

FIG. 14 shows a flowchart illustrating a method 1400 that supports downlink message protection for ambient wireless devices in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a downlink message including a first configuration for the ambient wireless device associated with one or more services. The operations of block 1405 may be performed in accordance with examples as disclosed herein. In some examples, aspects of the operations of 1405 may be performed by a message manager 725 as described with reference to FIG. 7.

At 1410, the method may include enabling the one or more services at the ambient wireless device based at least in part on the first configuration. The operations of block 1410 may be performed in accordance with examples as disclosed herein. In some examples, aspects of the operations of 1410 may be performed by a service manager 730 as described with reference to FIG. 7.

At 1415, the method may include receiving an encoded downlink message including a first key. The operations of block 1415 may be performed in accordance with examples as disclosed herein. In some examples, aspects of the operations of 1415 may be performed by a message manager 725 as described with reference to FIG. 7.

At 1420, the method may include decoding the encoded downlink message based at least in part on a second key, the encoded downlink message including a second configuration. The operations of block 1420 may be performed in accordance with examples as disclosed herein. In some examples, aspects of the operations of 1420 may be performed by a decoding manager 735 as described with reference to FIG. 7.

At 1425, the method may include decoding the encoded downlink message based at least in part on the second key and a third key, where the third key includes a group key associated with a set of multiple ambient wireless devices and the second key includes an inventory key associated with the ambient wireless device. The operations of block 1425 may be performed in accordance with examples as disclosed herein. In some examples, aspects of the operations of 1425 may be performed by a decoding manager 735 as described with reference to FIG. 7.

At 1430, the method may include modifying the one or more services or activating a response transmission associated with the ambient wireless device based at least in part on the second configuration. The operations of block 1430 may be performed in accordance with examples as disclosed herein. In some examples, aspects of the operations of 1430 may be performed by a service manager 730 as described with reference to FIG. 7.

Figure 15:
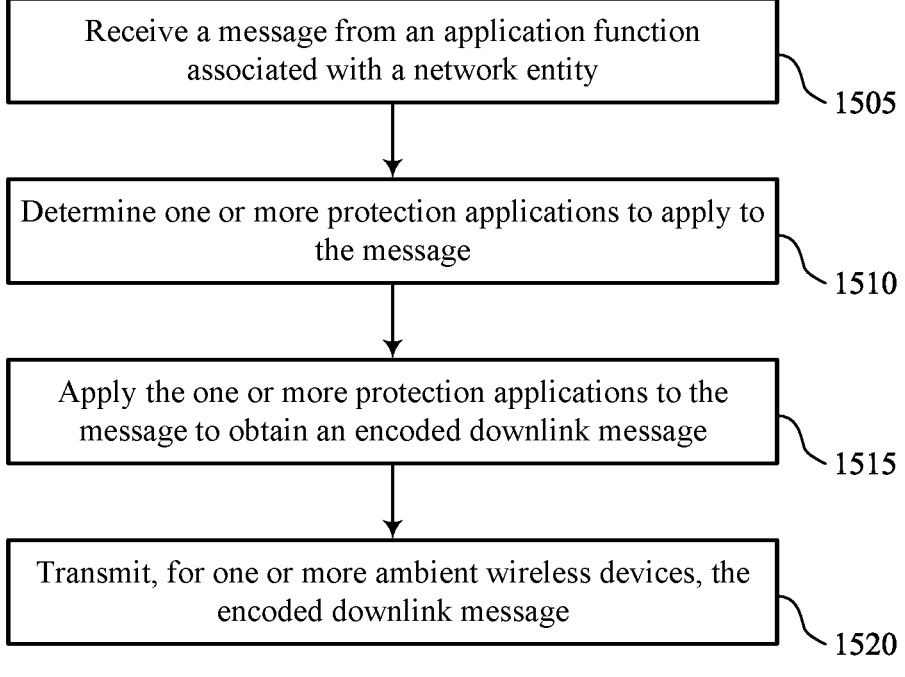

FIG. 15 shows a flowchart illustrating a method 1500 that supports downlink message protection for ambient wireless devices in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include receiving a message from an application function associated with a network entity. The operations of block 1505 may be performed in accordance with examples as disclosed herein. In some examples, aspects of the operations of 1505 may be performed by a message manager 1125 as described with reference to FIG. 11.

At 1510, the method may include determining one or more protection applications to apply to the message. The operations of block 1510 may be performed in accordance with examples as disclosed herein. In some examples, aspects of the operations of 1510 may be performed by a protection application function manager 1130 as described with reference to FIG. 11.

At 1515, the method may include applying the one or more protection applications to the message to obtain an encoded downlink message. The operations of block 1515 may be performed in accordance with examples as disclosed herein. In some examples, aspects of the operations of 1515 may be performed by an encoding manager 1135 as described with reference to FIG. 11.

At 1520, the method may include transmitting, for one or more ambient wireless devices, the encoded downlink message. The operations of block 1520 may be performed in accordance with examples as disclosed herein. In some examples, aspects of the operations of 1520 may be performed by a message manager 1125 as described with reference to FIG. 11.

FIG. 16 shows a flowchart illustrating a method 1600 that supports downlink message protection for ambient wireless devices in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include receiving a message from an application function associated with a network entity. The operations of block 1605 may be performed in accordance with examples as disclosed herein. In some examples, aspects of the operations of 1605 may be performed by a message manager 1125 as described with reference to FIG. 11.

At 1610, the method may include determining one or more protection applications to apply to the message. The operations of block 1610 may be performed in accordance with examples as disclosed herein. In some examples, aspects of the operations of 1610 may be performed by a protection application function manager 1130 as described with reference to FIG. 11.

At 1615, the method may include applying the one or more protection applications to the message to obtain an encoded downlink message. The operations of block 1615 may be performed in accordance with examples as disclosed herein. In some examples, aspects of the operations of 1615 may be performed by an encoding manager 1135 as described with reference to FIG. 11.

At 1620, the method may include transmitting, for one or more ambient wireless devices, the encoded downlink message. The operations of block 1620 may be performed in accordance with examples as disclosed herein. In some examples, aspects of the operations of 1620 may be performed by a message manager 1125 as described with reference to FIG. 11.

At 1625, the method may include transmitting the encoded downlink message to one or more UEs associated with the one or more ambient wireless devices. The operations of block 1625 may be performed in accordance with examples as disclosed herein. In some examples, aspects of the operations of 1625 may be performed by a message manager 1125 as described with reference to FIG. 11.

The following provides an overview of aspects of the present disclosure:

Aspect 1: A method for wireless communications at an ambient wireless device, comprising: receiving a downlink message comprising a first configuration for the ambient wireless device associated with one or more services; enabling the one or more services at the ambient wireless device based at least in part on the first configuration; receiving an encoded downlink message comprising a first key; decoding the encoded downlink message based at least in part on a second key, the encoded downlink message comprising a second configuration; and modifying the one or more services or activating a response transmission associated with the ambient wireless device based at least in part on the second configuration.

Aspect 2: The method of aspect 1, wherein receiving the encoded downlink message is based at least in part on a change to the one or more configurations for services, a requested response transmission from the ambient wireless device, or both.

Aspect 3: The method of any of aspects 1 through 2, wherein the first key and the second key are a single shared key between the ambient wireless device and an application function associated with a network entity.

Aspect 4: The method of any of aspects 1 through 3, wherein the second key is based at least in part on a shared key between the ambient wireless device and an application function associated with a network entity.

Aspect 5: The method of any of aspects 1 through 4, wherein the second key is associated with one or more key refresh parameters.

Aspect 6: The method of any of aspects 1 through 5, wherein the encoded downlink message further comprises a token.

Aspect 7: The method of aspect 6, wherein receiving the encoded downlink message further comprises: receiving the encoded downlink message from an ambient wireless controller associated with a network entity, via one or more UEs; and verifying authorization of the ambient wireless controller to transmit the encoded downlink message to the ambient wireless device based at least in part on the token.

Aspect 8: The method of aspect 7, wherein decoding the encoded downlink message is based at least in part on verifying authorization of the ambient wireless controller using the token.

Aspect 9: The method of any of aspects 1 through 8, wherein the second key is generated by an ambient wireless controller associated with a network entity.

Aspect 10: The method of any of aspects 1 through 9, wherein the second key is generated by an application function associated with a network entity.

Aspect 11: The method of any of aspects 1 through 10, wherein receiving the encoded downlink message further comprises: receiving the encoded downlink message from an ambient wireless controller associated with a network entity, wherein the encoded downlink message comprises a signature; and verifying authorization of the ambient wireless controller to transmit the encoded downlink message to the ambient wireless device based at least in part on the signature.

Aspect 12: The method of any of aspects 1 through 11, wherein the one or more services are associated with location or tracking.

Aspect 13: The method of any of aspects 1 through 12, wherein decoding the encoded downlink message further comprises: decoding the encoded downlink message based at least in part on the second key and a third key, wherein the third key comprises a group key associated with a plurality of ambient wireless devices and the second key comprises an inventory key associated with the ambient wireless device.

Aspect 14: The method of aspect 13, wherein the inventory key is based at least in part on the group key.

Aspect 15: A method for wireless communications at an ambient wireless controller, comprising: receiving a message from an application function associated with a network entity; determining one or more protection applications to apply to the message; applying the one or more protection applications to the message to obtain an encoded downlink message; and transmitting, for one or more ambient wireless devices, the encoded downlink message.

Aspect 16: The method of aspect 15, wherein the message comprises the encoded downlink message, a downlink information for the encoded downlink message, a first key, a token, or any combination thereof.

Aspect 17: The method of any of aspects 15 through 16, wherein the one or more protection applications comprise one or more command protection applications, one or more inventory protection applications, or a combination thereof.

Aspect 18: The method of any of aspects 15 through 17, wherein transmitting the encoded downlink message is based at least in part on a change to one or more configurations for services provided by the one or more ambient wireless devices, a requested response transmission from the one or more ambient wireless devices, or both.

Aspect 19: The method of any of aspects 15 through 18, wherein a first key of the message is based at least in part on a shared key between the one or more ambient wireless devices and the application function.

Aspect 20: The method of any of aspects 15 through 19, wherein a first key of the message is associated with one or more key refresh parameters.

Aspect 21: The method of any of aspects 15 through 20, wherein the encoded downlink message comprises a token of the message.

Aspect 22: The method of any of aspects 15 through 21, wherein transmitting the encoded downlink message further comprises: transmitting the encoded downlink message to one or more UEs associated with the one or more ambient wireless devices.

Aspect 23: The method of aspect 22, wherein the one or more UEs comprise a network reader, a device reader, or both.

Aspect 24: The method of any of aspects 15 through 23, wherein applying the one or more protection applications further comprises: encoding downlink information of the message using a first key of the message from the application function; and transmitting the encoded downlink message for the one or more ambient wireless devices.

Aspect 25: The method of any of aspects 15 through 24, wherein applying the one or more protection applications further comprises: receive an authorization token and a first key from the application function encoding downlink information of the message using the first key of the message; sign the encoded downlink information using a signing key of the message, wherein the signed encoded downlink information comprises the authorization token; and transmitting the encoded downlink message for the one or more ambient wireless devices.

Aspect 26: The method of any of aspects 15 through 25, wherein applying the one or more protection applications further comprises: generating a first key; encoding downlink information of the message using the first key; and transmitting the encoded downlink message for the one or more ambient wireless devices.

Aspect 27: The method of any of aspects 15 through 26, wherein applying the one or more protection applications further comprises: receiving a group key from the application function, the group key associated with at least the one or more ambient wireless devices; encoding downlink information of the message using an inventory key based at least in part on the group key; and transmitting the encoded downlink message for the one or more ambient wireless devices.

Aspect 28: An ambient wireless device for wireless communications, comprising one or more memories storing processor-executable code, and one or more processors coupled with the one or more memories and individually or collectively operable to execute the code to cause the ambient wireless device to perform a method of any of aspects 1 through 14.

Aspect 29: An ambient wireless device for wireless communications, comprising at least one means for performing a method of any of aspects 1 through 14.

Aspect 30: A non-transitory computer-readable medium storing code for wireless communications, the code comprising instructions executable by one or more processors to perform a method of any of aspects 1 through 14.

Aspect 31: An ambient wireless controller for wireless communications, comprising one or more memories storing processor-executable code, and one or more processors coupled with the one or more memories and individually or collectively operable to execute the code to cause the ambient wireless controller to perform a method of any of aspects 15 through 27.

Aspect 32: An ambient wireless controller for wireless communications, comprising at least one means for performing a method of any of aspects 15 through 27.

Aspect 33: A non-transitory computer-readable medium storing code for wireless communications, the code comprising instructions executable by one or more processors to perform a method of any of aspects 15 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An ambient wireless device, comprising:
one or more memories storing processor-executable code; and
one or more processors coupled with the one or more memories and individually or collectively operable to execute the code to cause the ambient wireless device to:
receive a downlink message comprising a first configuration for the ambient wireless device associated with one or more services, wherein the one or more services are associated with location or tracking;
enable the one or more services at the ambient wireless device based at least in part on the first configuration;
receive an encoded downlink message comprising a first key;
decode the encoded downlink message based at least in part on a second key, the encoded downlink message comprising a second configuration; and
modify the one or more services or activate a response transmission associated with the ambient wireless device based at least in part on the second configuration.

2. The ambient wireless device of claim 1, wherein receiving the encoded downlink message is based at least in part on a change to one or more configurations for services, a requested response transmission from the ambient wireless device, or both.

3. The ambient wireless device of claim 1, wherein the first key and the second key are a single shared key between the ambient wireless device and an application function associated with a network entity.

4. The ambient wireless device of claim 1, wherein the second key is based at least in part on a shared key between the ambient wireless device and an application function associated with a network entity.

5. The ambient wireless device of claim 1, wherein the second key is associated with one or more key refresh parameters.

6. The ambient wireless device of claim 1, wherein the encoded downlink message further comprises a token.

7. The ambient wireless device of claim 6, wherein, to receive the encoded downlink message, the one or more processors are individually or collectively further operable to execute the code to cause the ambient wireless device to:
receive the encoded downlink message from an ambient wireless controller associated with a network entity, via one or more user equipments; and
verify authorization of the ambient wireless controller to transmit the encoded downlink message to the ambient wireless device based at least in part on the token.

8. The ambient wireless device of claim 7, where decoding the encoded downlink message is based at least in part on verifying authorization of the ambient wireless controller using the token.

9. The ambient wireless device of claim 1, wherein the second key is generated by an ambient wireless controller associated with a network entity.

10. The ambient wireless device of claim 1, wherein the second key is generated by an application function associated with a network entity.

11. The ambient wireless device of claim 1, wherein, to receive the encoded downlink message, the one or more processors are individually or collectively further operable to execute the code to cause the ambient wireless device to:
receive the encoded downlink message from an ambient wireless controller associated with a network entity, wherein the encoded downlink message comprises a signature; and
verify authorization of the ambient wireless controller to transmit the encoded downlink message to the ambient wireless device based at least in part on the signature.

12. The ambient wireless device of claim 1, wherein, to decode the encoded downlink message, the one or more processors are individually or collectively further operable to execute the code to cause the ambient wireless device to:
decode the encoded downlink message based at least in part on the second key and a third key, wherein the third key comprises a group key associated with a plurality of ambient wireless devices and the second key comprises an inventory key associated with the ambient wireless device.

13. The ambient wireless device of claim 12, wherein the inventory key is based at least in part on the group key.

14. An ambient wireless controller, comprising:
one or more memories storing processor-executable code; and
one or more processors coupled with the one or more memories and individually or collectively operable to execute the code to cause the ambient wireless controller to:
receive a message from an application function associated with a network entity;
determine one or more protection applications to apply to the message;
apply the one or more protection applications to the message to obtain an encoded downlink message; and
transmit, for one or more ambient wireless devices, the encoded downlink message, wherein the message comprises the encoded downlink message, a downlink information for the encoded downlink message, a first key, a token, or any combination thereof.

15. The ambient wireless controller of claim 14, wherein the one or more protection applications comprise one or more command protection applications, one or more inventory protection applications, or a combination thereof.

16. The ambient wireless controller of claim 15, further comprising:

transmitting the encoded downlink message is based at least in part on a change to one or more service configurations for the one or more ambient wireless devices, a requested response transmission from the one or more ambient wireless devices, or both.

17. The ambient wireless controller of claim 14, wherein a first key of the message is based at least in part on a shared key between the one or more ambient wireless devices and the application function.

18. The ambient wireless controller of claim 14, wherein a first key of the message is associated with one or more key refresh parameters.

19. The ambient wireless controller of claim 14, wherein the encoded downlink message comprises a token of the message.

20. The ambient wireless controller of claim 14, wherein, to transmit the encoded downlink message, the one or more processors are individually or collectively further operable to execute the code to cause the ambient wireless controller to:

transmit the encoded downlink message to one or more user equipments (UEs) associated with the one or more ambient wireless devices.

21. The ambient wireless controller of claim 20, wherein the one or more UEs comprise a network reader, a device reader, or both.

22. The ambient wireless controller of claim 14, wherein, to apply the one or more protection applications, the one or more processors are individually or collectively further operable to execute the code to cause the ambient wireless controller to:

encode downlink information of the message using a first key of the message from the application function; and transmit the encoded downlink message for the one or more ambient wireless devices.

23. The ambient wireless controller of claim 14, wherein, to apply the one or more protection applications, the one or more processors are individually or collectively further operable to execute the code to cause the ambient wireless controller to:

receive an authorization token and a first key from the application function;

encode downlink information of the message using the first key of the message;

sign the encoded downlink information using a signing key of the message, wherein the signed encoded downlink information comprises the authorization token; and transmit the encoded downlink message for the one or more ambient wireless devices.

24. The ambient wireless controller of claim 14, wherein, to apply the one or more protection applications, the one or more processors are individually or collectively further operable to execute the code to cause the ambient wireless controller to:

generate a first key;

encode downlink information of the message using the first key; and transmit the encoded downlink message for the one or more ambient wireless devices.

25. The ambient wireless controller of claim 14, wherein, to apply the one or more protection applications, the one or more processors are individually or collectively further operable to execute the code to cause the ambient wireless controller to:

receive a group key from the application function, the group key associated with at least the one or more ambient wireless devices;

encode downlink information of the message using an inventory key based at least in part on the group key; and transmit the encoded downlink message for the one or more ambient wireless devices.

26. A method for wireless communications at an ambient wireless device, comprising:

receiving a downlink message comprising a first configuration for the ambient wireless device associated with one or more services, wherein the one or more services are associated with location or tracking;

enabling the one or more services at the ambient wireless device based at least in part on the first configuration;

receiving an encoded downlink message comprising a first key;

decoding the encoded downlink message based at least in part on a second key, the encoded downlink message comprising a second configuration; and modifying the one or more services or activating a response transmission associated with the ambient wireless device based at least in part on the second configuration.

27. A method for wireless communications at an ambient wireless controller, comprising:

receiving a message from an application function associated with a network entity;

determining one or more protection applications to apply to the message;

applying the one or more protection applications to the message to obtain an encoded downlink message; and transmitting, for one or more ambient wireless devices, the encoded downlink message, wherein the message comprises the encoded downlink message, a downlink information for the encoded downlink message, a first key, a token, or any combination thereof.

* * * * *